US010484677B2

(12) United States Patent
Chen et al.

(10) Patent No.: US 10,484,677 B2
(45) Date of Patent: Nov. 19, 2019

(54) SAMPLE ADAPTIVE OFFSET (SAO) IN ACCORDANCE WITH VIDEO CODING

(71) Applicant: BROADCOM CORPORATION, Irvine, CA (US)

(72) Inventors: Peisong Chen, San Diego, CA (US); Wade K. Wan, Orange, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 670 days.

(21) Appl. No.: 15/053,304

(22) Filed: Feb. 25, 2016

(65) Prior Publication Data

US 2016/0173870 A1 Jun. 16, 2016

Related U.S. Application Data

(63) Continuation of application No. 13/758,169, filed on Feb. 4, 2013, now Pat. No. 9,282,328.

(60) Provisional application No. 61/603,190, filed on Feb. 24, 2012, provisional application No. 61/598,326, filed on Feb. 13, 2012, provisional application No. 61/597,683, filed on Feb. 10, 2012.

(51) Int. Cl.
*H04N 7/26* (2006.01)
*H04N 19/10* (2014.01)
*H04N 19/82* (2014.01)
*H04N 19/86* (2014.01)

(52) U.S. Cl.
CPC ............. *H04N 19/10* (2014.11); *H04N 19/82* (2014.11); *H04N 19/86* (2014.11)

(58) Field of Classification Search
CPC .............................. H04N 19/86; H04N 19/82
See application file for complete search history.

(56) References Cited

U.S. PATENT DOCUMENTS

| 2013/0136167 A1* | 5/2013 | Chong | H04N 19/70 |
| | | | 375/240.02 |
| 2013/0177068 A1* | 7/2013 | Minoo | H04N 19/117 |
| | | | 375/240.02 |
| 2014/0119433 A1* | 5/2014 | Park | H04N 19/44 |
| | | | 375/240.02 |

* cited by examiner

*Primary Examiner* — William C Vaughn, Jr.
*Assistant Examiner* — Jerry T Jean Baptiste
(74) *Attorney, Agent, or Firm* — Garlick & Markison; Edward J. Marshall

(57) ABSTRACT

Sample adaptive offset (SAO) in accordance with video coding. SAO filtering may be performed before de-blocking processing (e.g., in accordance with video signal decoding and/or encoding). For example, a receiver and/or decoder communication device may receive signaling from a transmitter and/or encoder communication device that includes various band offsets. Corresponding band indices may be determined via analysis of the received video signal (e.g., received from the transmitter and/or encoder communication device), inferentially without requiring signaling of such band indices from the transmitter and/or encoder communication device. Upon appropriate analysis of one or more largest coding units (LCUs) generated from the video signal to determine a pixel value distribution (e.g., which may be using a histogram in one instance), then based on that pixel value distribution, the band indices are identified and the band offsets applied thereto.

18 Claims, 19 Drawing Sheets

301

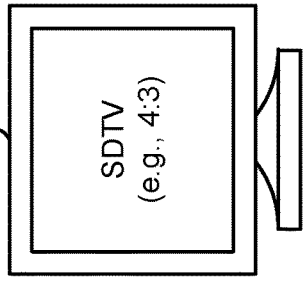

HDTV (e.g., 16:9)

from media content provider and/or other source device

SDTV (e.g., 4:3)

from media content provider and/or other source device

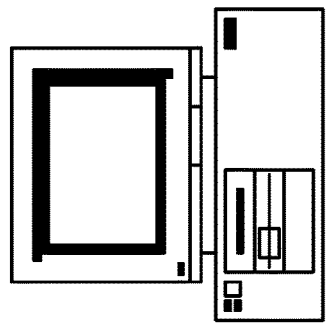

FIG. 3E

306 from media content provider — set top box (SD and/or HD) — to display capable device (e.g., TV)

DVD player (e.g., Blu-Ray, SD, HD, etc.) — to display capable device (e.g., TV)

FIG. 3G

308 from media content provider and/or other source device — digital image processing device — to display capable device (e.g., TV)

FIG. 3H

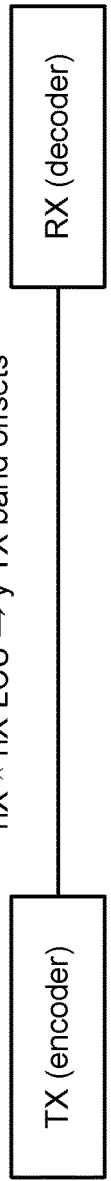
FIG. 13

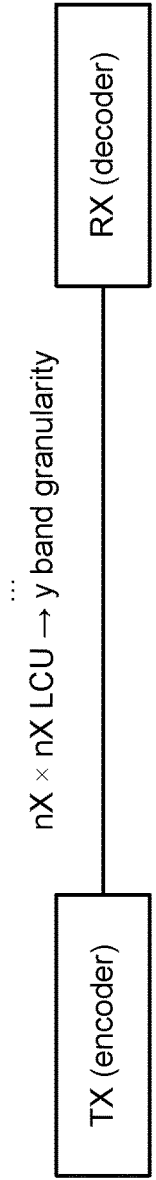
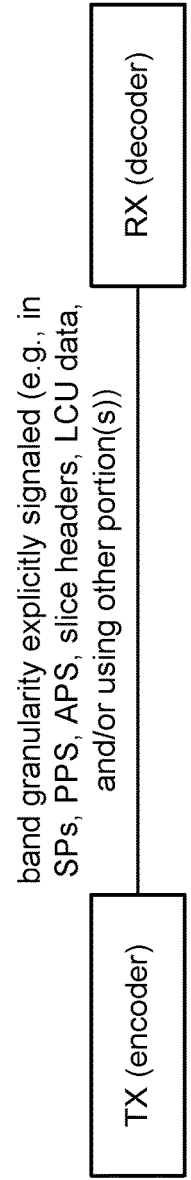
FIG. 14

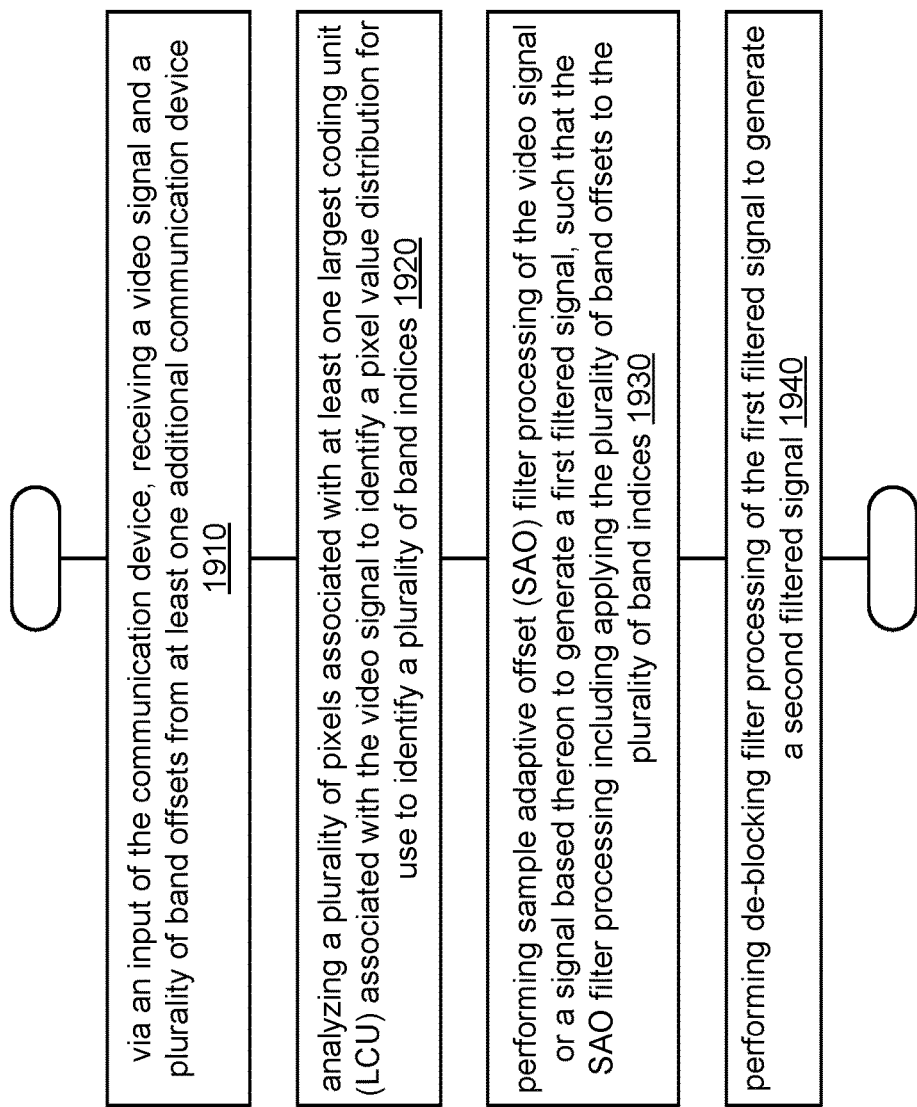

SAMPLE ADAPTIVE OFFSET (SAO) IN ACCORDANCE WITH VIDEO CODING

CROSS REFERENCE TO RELATED PATENTS/PATENT APPLICATIONS

The present U.S. Utility patent application claims priority pursuant to 35 U.S.C. § 120 as a continuation of U.S. Utility application Ser. No. 13/758,169, entitled "Sample adaptive offset (SAO) in accordance with video coding," filed Feb. 4, 2013, pending, and scheduled subsequently to be issued as U.S. Pat. No. 9,282,328 on Mar. 8, 2016 (as indicated in an ISSUE NOTIFICATION mailed from the USPTO on Feb. 17, 2016), which claims priority pursuant to 35 U.S.C. § 119(e) to U.S. Provisional Application No. 61/597,683, entitled "Frequency domain sample adaptive offset," filed Feb. 10, 2012, U.S. Provisional Application No. 61/598,326, entitled "Sample adaptive offset (SAO) in accordance with video coding," filed Feb. 13, 2012, and U.S. Provisional Application No. 61/603,190, entitled "Frequency domain sample adaptive offset (SAO)," filed Feb. 24, 2012, all of which are hereby incorporated herein by reference in their entirety and made part of the present U.S. Utility patent application for all purposes.

INCORPORATION BY REFERENCE

The following U.S. Utility patent application is hereby incorporated herein by reference in its entirety and made part of the present U.S. Utility patent application for all purposes:

1. U.S. Utility patent application Ser. No. 13/623,765, entitled "Frequency domain sample adaptive offset (SAO)," filed Sep. 20, 2012, pending, which claims priority pursuant to 35 U.S.C. § 119(e) to the following U.S. Provisional patent application which is hereby incorporated herein by reference in its entirety and made part of the present U.S. Utility patent application for all purposes:
    1.1. U.S. Provisional Application No. 61/597,683, entitled "Frequency domain sample adaptive offset," filed Feb. 10, 2012.
    1.2. U.S. Provisional Application No. 61/603,190, entitled "Frequency domain sample adaptive offset (SAO)," filed Feb. 24, 2012.

The following standards/draft standards are hereby incorporated herein by reference in their entirety and are made part of the present U.S. Utility patent application for all purposes:

1. "High Efficiency Video Coding (HEVC) text specification draft 10 (for FDIS & Consent)," Joint Collaborative Team on Video Coding (JCT-VC) of ITU-T SG 16 WP 3 and ISO/IEC JTC 1/SC 29/WG 11, 12th Meeting: Geneva, CH, 14-23 Jan. 2013, Document: JCTVC-L1003_v11, 332 pages.

2. International Telecommunication Union, ITU-T, TELECOMMUNICATION STANDARDIZATION SECTOR OF ITU, H.264 (March 2010), SERIES H: AUDIO-VISUAL AND MULTIMEDIA SYSTEMS, Infrastructure of audiovisual services—Coding of moving video, Advanced video coding for generic audiovisual services, Recommendation ITU-T H.264, also alternatively referred to as International Telecomm ISO/IEC 14496-10—MPEG-4 Part 10, AVC (Advanced Video Coding), H.264/MPEG-4 Part 10 or AVC (Advanced Video Coding), ITU H.264/MPEG4-AVC, or equivalent.

BACKGROUND OF THE INVENTION

Technical Field of the Invention

The invention relates generally to digital video processing; and, more particularly, it relates to processing and operations in accordance with such digital video processing.

Description of Related Art

Communication systems that operate to communicate digital media (e.g., images, video, data, etc.) have been under continual development for many years. With respect to such communication systems employing some form of video data, a number of digital images are output or displayed at some frame rate (e.g., frames per second) to effectuate a video signal suitable for output and consumption. Within many such communication systems operating using video data, there can be a trade-off between throughput (e.g., number of image frames that may be transmitted from a first location to a second location) and video and/or image quality of the signal eventually to be output or displayed. The present art does not adequately or acceptably provide a means by which video data may be transmitted from a first location to a second location in accordance with providing an adequate or acceptable video and/or image quality, ensuring a relatively low amount of overhead associated with the communications, relatively low complexity of the communication devices at respective ends of communication links, etc.

BRIEF DESCRIPTION OF THE SEVERAL VIEWS OF THE DRAWINGS

FIG. 3A illustrates an embodiment of a computer.

FIG. 3B illustrates an embodiment of a laptop computer.

FIG. 3C illustrates an embodiment of a high definition (HD) television.

FIG. 3D illustrates an embodiment of a standard definition (SD) television.

FIG. 3E illustrates an embodiment of a handheld media unit.

FIG. 3F illustrates an embodiment of a set top box (STB).

FIG. 3G illustrates an embodiment of a digital video disc (DVD) player.

FIG. 3H illustrates an embodiment of a generic digital image and/or video processing device.

FIG. 13 illustrates various embodiments of indication (adaptive and/or explicit signaling) transmitted band offsets in sample adaptive offset (SAO) band offset mode.

FIG. 14 illustrates various embodiments of indication (adaptive and/or explicit signaling) band granularity in SAO band offset mode.

FIG. 18 and FIG. 19 illustrate various embodiments of method for operating one or more devices (e.g., communication devices, receiver and/or decoder devices, transmitter and/or encoder devices, etc.).

DETAILED DESCRIPTION OF THE INVENTION

Figure 1:
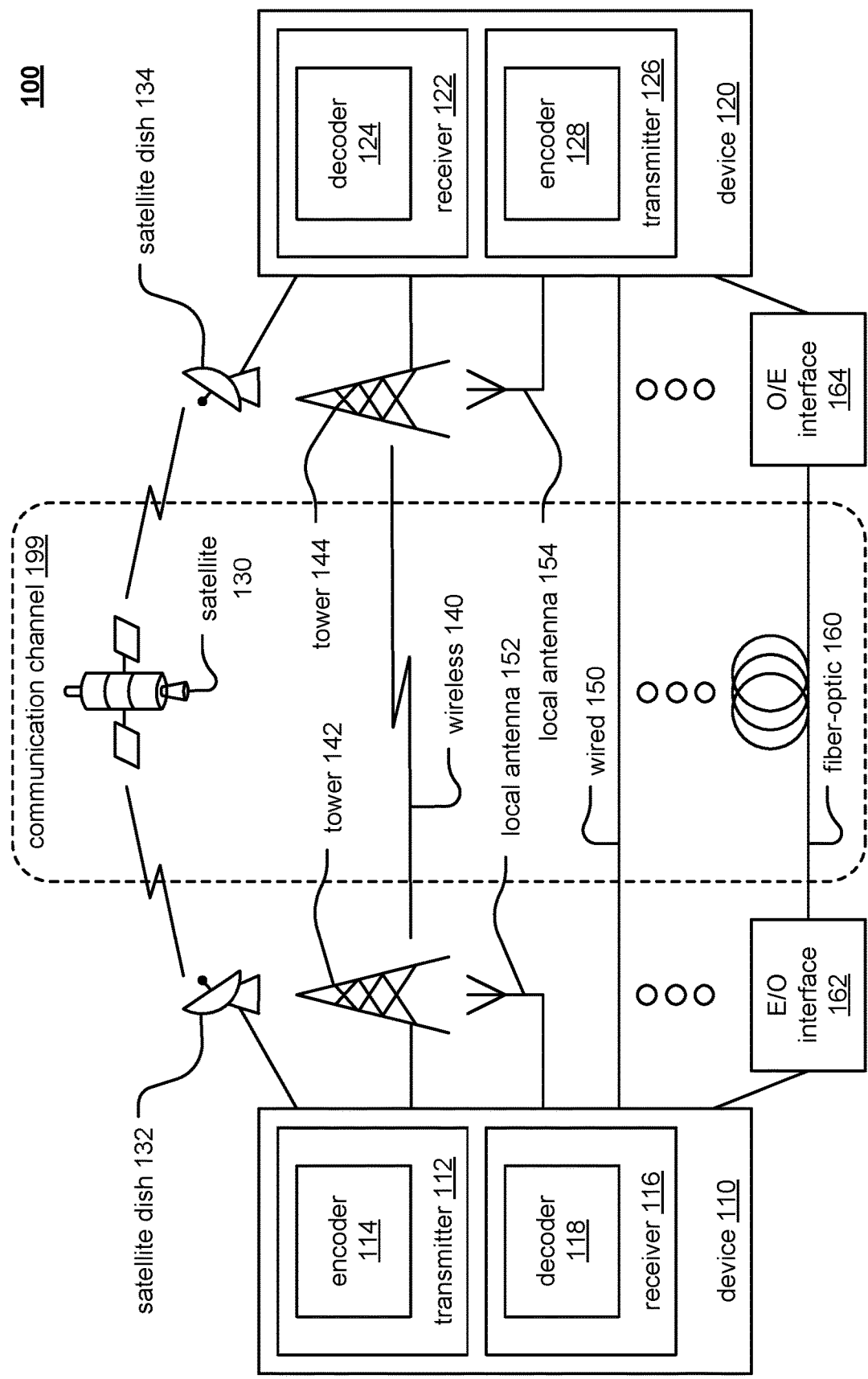
FIG. 1 and FIG. 2 illustrate various embodiments of communication systems.

Within many devices that use digital media such as digital video, respective images thereof, being digital in nature, are represented using pixels. Within certain communication systems, digital media can be transmitted from a first location to a second location at which such media can be output or displayed. The goal of digital communications systems, including those that operate to communicate digital video, is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and/or other types of media as well.

Figure 2:
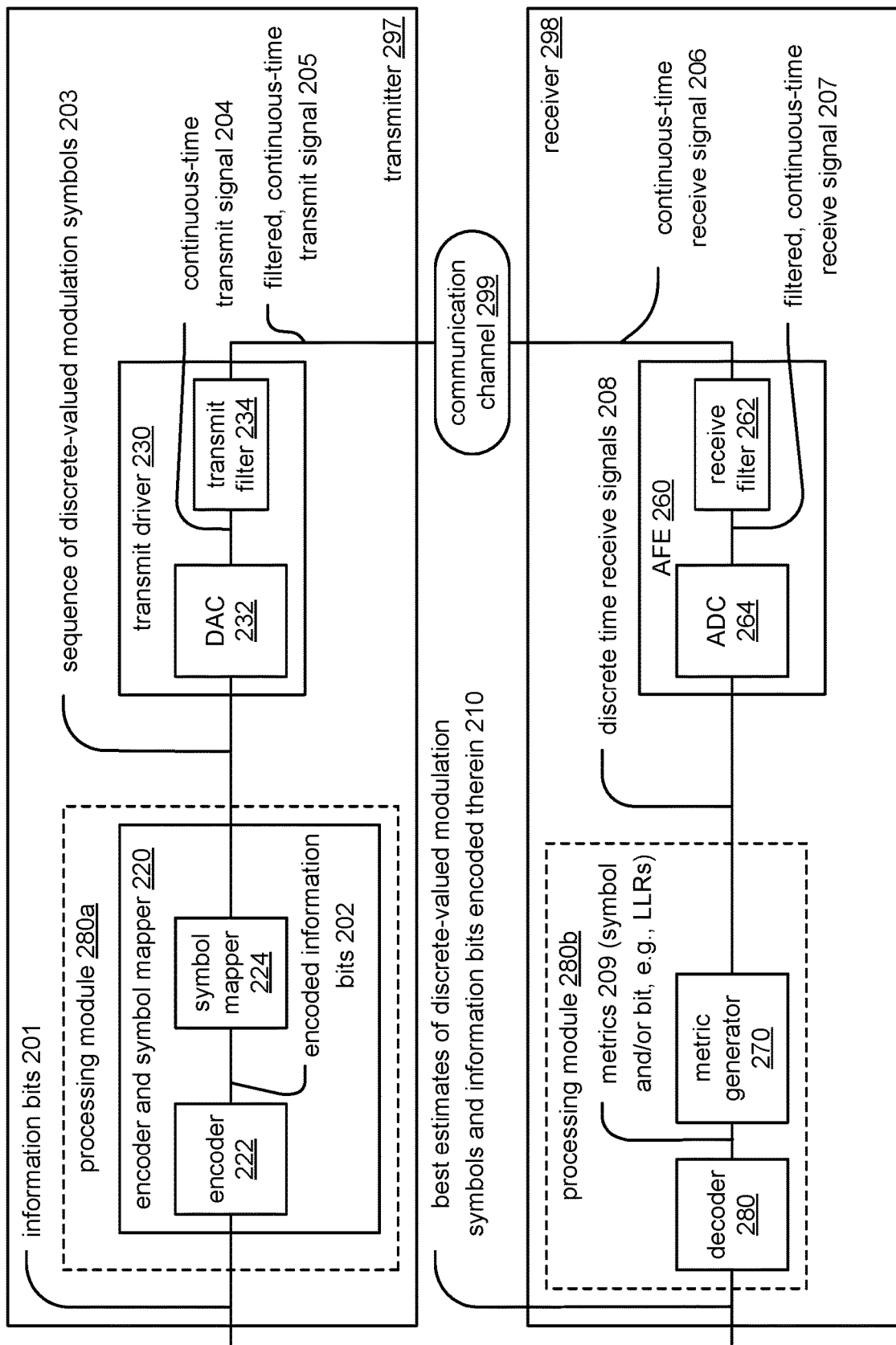

FIG. 1 and FIG. 2 are diagrams illustrate various embodiments of communication systems, 100 and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented/interfaced together thereby forming the communication channel 199.

It is noted that such communication devices 110 and/or 120 may be stationary or mobile without departing from the scope and spirit of the invention. For example, either one or both of the communication devices 110 and 120 may be implemented in a fixed location or may be a mobile communication device with capability to associate with and/or communicate with more than one network access point (e.g., different respective access points (APs) in the context of a mobile communication system including one or more wireless local area networks (WLANs), different respective satellites in the context of a mobile communication system including one or more satellite, or generally, different respective network access points in the context of a mobile communication system including one or more network access points by which communications may be effectuated with communication devices 110 and/or 120.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional embodiment such as in accordance with a video broadcast embodiment).

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct functional blocks 222 and 224, respectively, such that encoded information bits 202 are output from encoder 222 and provided to symbol mapper 224) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. Therein may be implemented. For example, this diagram shows a processing module 280a as including the encoder and symbol mapper 220 and all associated, corresponding components therein, and a processing module 280 is shown as including the metric generator 270 and the decoder 280 and all associated, corresponding components therein. Such processing modules 280a and 280b may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299).

Digital image and/or video processing of digital images and/or media (including the respective images within a digital video signal) may be performed by any of the various devices depicted below in FIG. 3A-3H to allow a user to view such digital images and/or video. These various devices do not include an exhaustive list of devices in which the image and/or video processing described herein may be effectuated, and it is noted that any generic digital image and/or video processing device may be implemented to perform the processing described herein without departing from the scope and spirit of the invention.

FIG. 3A illustrates an embodiment of a computer 301. The computer 301 can be a desktop computer, or an enterprise storage devices such a server, of a host computer that is attached to a storage array such as a redundant array of independent disks (RAID) array, storage router, edge router, storage switch and/or storage director. A user is able to view still digital images and/or video (e.g., a sequence of digital images) using the computer 301. Oftentimes, various image and/or video viewing programs and/or media player programs are included on a computer 301 to allow a user to view such images (including video).

FIG. 3B illustrates an embodiment of a laptop computer 302. Such a laptop computer 302 may be found and used in any of a wide variety of contexts. In recent years, with the ever-increasing processing capability and functionality found within laptop computers, they are being employed in many instances where previously higher-end and more capable desktop computers would be used. As with computer 301, laptop computer 302 may include various image viewing programs and/or media player programs to allow a user to view such images (including video).

FIG. 3C illustrates an embodiment of a high definition (HD) television 303. Many HD televisions 303 include an integrated tuner to allow the receipt, processing, and decoding of media content (e.g., television broadcast signals) thereon. Alternatively, sometimes an HD television 303 receives media content from another source such as a digital video disc (DVD) player, set top box (STB) that receives, processes, and decodes a cable and/or satellite television broadcast signal. Regardless of the particular implementation, the HD television 303 may be implemented to perform image and/or video processing as described herein. Generally speaking, an HD television 303 has capability to display HD media content and oftentimes is implemented having a 16:9 widescreen aspect ratio.

FIG. 3D illustrates an embodiment of a standard definition (SD) television 304. Of course, an SD television 304 is somewhat analogous to an HD television 303, with at least one difference being that the SD television 304 does not include capability to display HD media content, and an SD television 304 oftentimes is implemented having a 4:3 full screen aspect ratio. Nonetheless, even an SD television 304 may be implemented to perform image and/or video processing as described herein.

FIG. 3E illustrates an embodiment of a handheld media unit 305. A handheld media unit 305 may operate to provide general storage or storage of image/video content information such as joint photographic experts group (JPEG) files, tagged image file format (TIFF), bitmap, motion picture experts group (MPEG) files, Windows Media (WMA/WMV) files, other types of video content such as MPEG4 files, etc. for playback to a user, and/or any other type of information that may be stored in a digital format. Historically, such handheld media units were primarily employed for storage and playback of audio media; however, such a handheld media unit 305 may be employed for storage and playback of virtual any media (e.g., audio media, video media, photographic media, etc.). Moreover, such a handheld media unit 305 may also include other functionality such as integrated communication circuitry for wired and wireless communications. Such a handheld media unit 305 may be implemented to perform image and/or video processing as described herein.

FIG. 3F illustrates an embodiment of a set top box (STB) 306. As mentioned above, sometimes a STB 306 may be implemented to receive, process, and decode a cable and/or satellite television broadcast signal to be provided to any appropriate display capable device such as SD television 304 and/or HD television 303. Such an STB 306 may operate independently or cooperatively with such a display capable device to perform image and/or video processing as described herein.

FIG. 3G illustrates an embodiment of a digital video disc (DVD) player 307. Such a DVD player may be a Blu-Ray DVD player, an HD capable DVD player, an SD capable DVD player, an up-sampling capable DVD player (e.g., from SD to HD, etc.) without departing from the scope and spirit of the invention. The DVD player may provide a signal to any appropriate display capable device such as SD television 304 and/or HD television 303. The DVD player 305 may be implemented to perform image and/or video processing as described herein.

FIG. 3H illustrates an embodiment of a generic digital image and/or video processing device 308. Again, as mentioned above, these various devices described above do not include an exhaustive list of devices in which the image and/or video processing described herein may be effectuated, and it is noted that any generic digital image and/or video processing device 308 may be implemented to perform the image and/or video processing described herein without departing from the scope and spirit of the invention.

Figure 4:
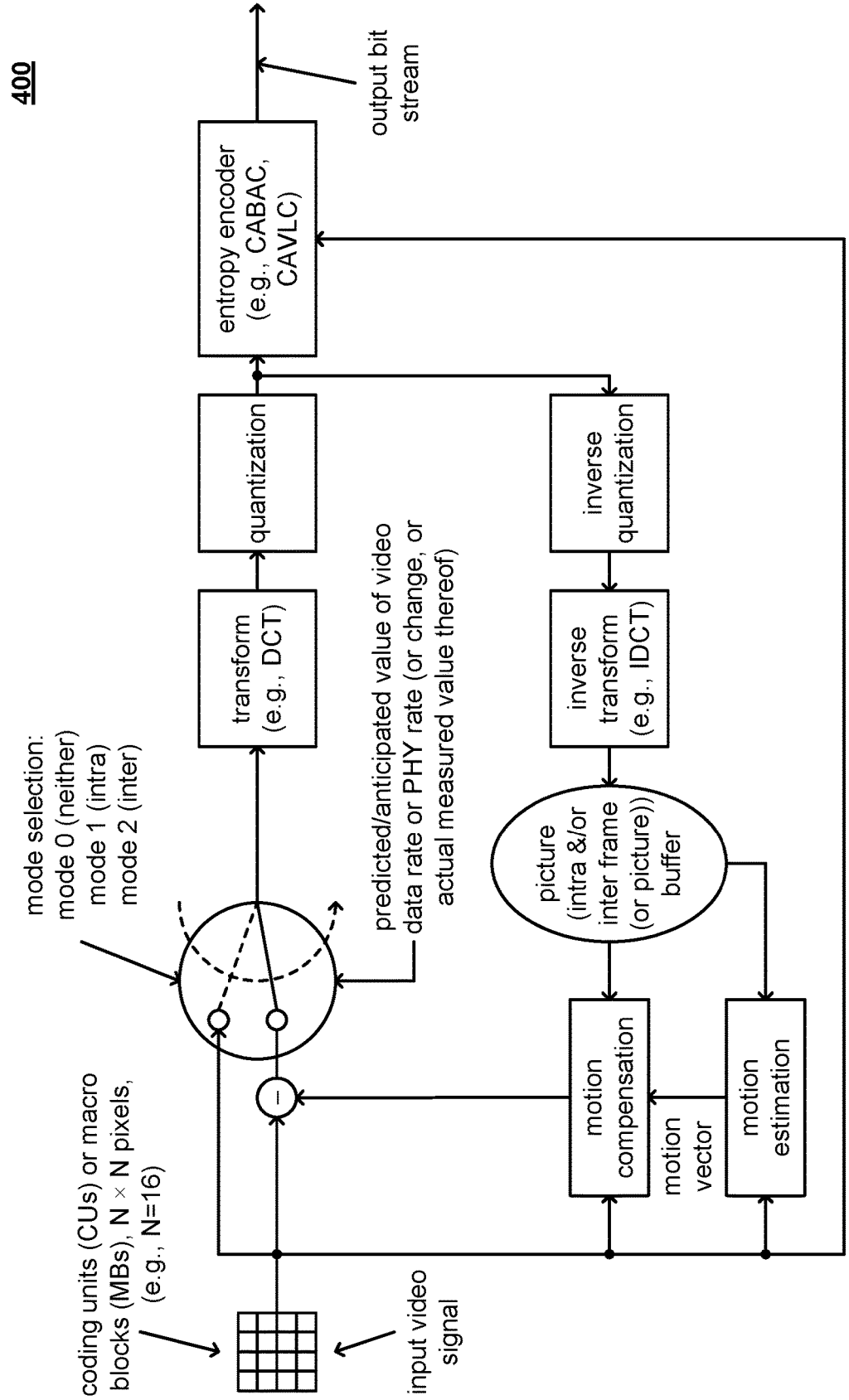
FIG. 4, FIG. 5, and FIG. 6 are diagrams illustrating various embodiments of video encoding architectures.
Figure 5:
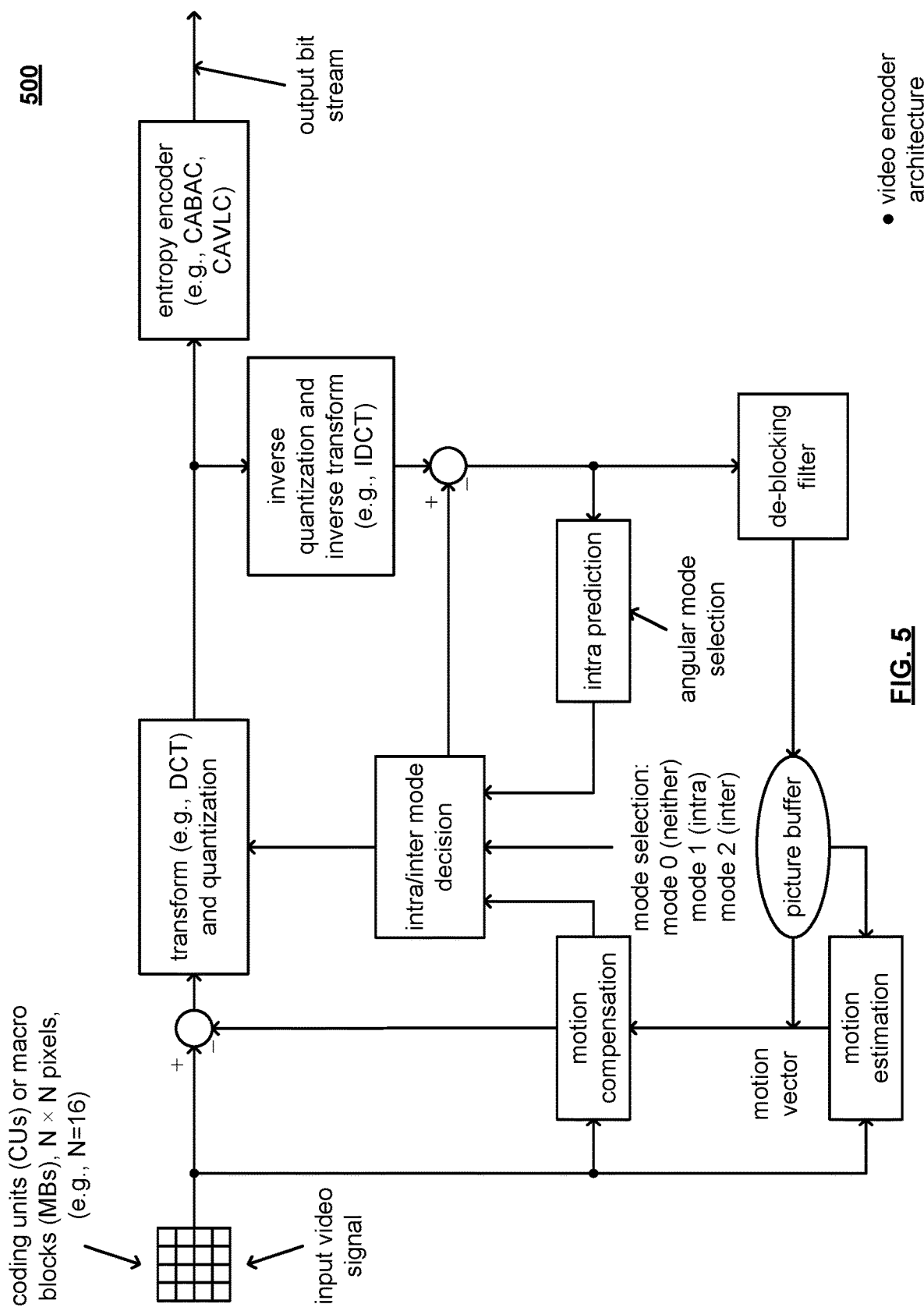
Figure 6:
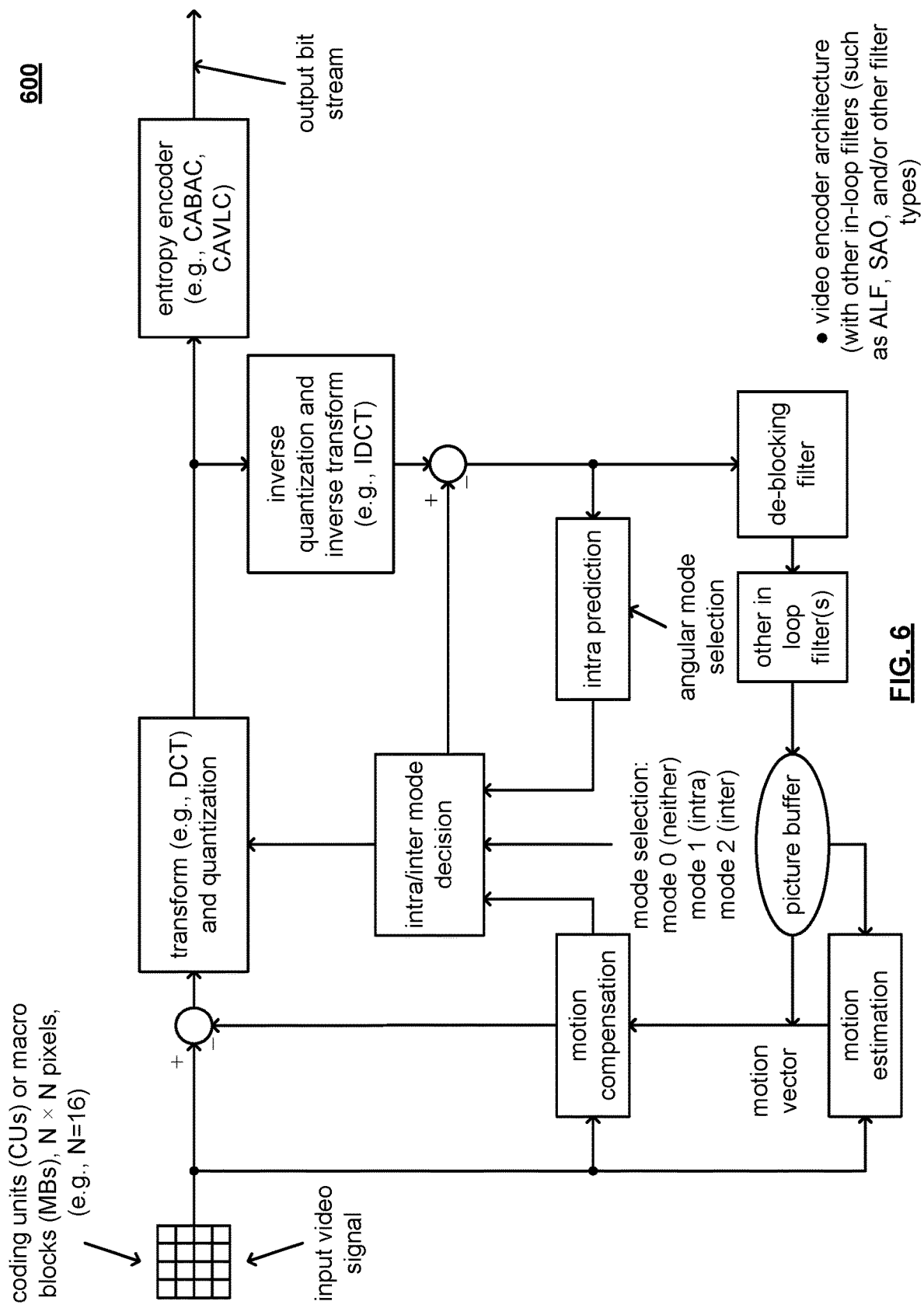

FIG. 4, FIG. 5, and FIG. 6 are diagrams illustrating various embodiments 400 and 500, and 600, respectively, of video encoding architectures.

Referring to embodiment 400 of FIG. 4, as may be seen with respect to this diagram, an input video signal is received by a video encoder. In certain embodiments, the input video signal is composed of coding units (CUs) or macro-blocks (MBs). The size of such coding units or macro-blocks may be varied and can include a number of pixels typically arranged in a square shape. In one embodiment, such coding units or macro-blocks have a size of 16×16 pixels. However, it is generally noted that a macro-block may have any desired size such as N×N pixels, where N is an integer (e.g., 16×16, 8×8, or 4×4). Of course, some implementations may include non-square shaped coding units or macro-blocks, although square shaped coding units or macro-blocks are employed in a preferred embodiment.

The input video signal may generally be referred to as corresponding to raw frame (or picture) image data. For example, raw frame (or picture) image data may undergo processing to generate luma and chroma samples. In some embodiments, the set of luma samples in a macro-block is of one particular arrangement (e.g., 16×16), and set of the chroma samples is of a different particular arrangement (e.g., 8×8). In accordance with the embodiment depicted herein, a video encoder processes such samples on a block by block basis.

The input video signal then undergoes mode selection by which the input video signal selectively undergoes intra and/or inter-prediction processing. Generally speaking, the input video signal undergoes compression along a compression pathway. When operating with no feedback (e.g., in accordance with neither inter-prediction nor intra-prediction), the input video signal is provided via the compression pathway to undergo transform operations (e.g., in accordance with discrete cosine transform (DCT)). Of course, other transforms may be employed in alternative embodiments. In this mode of operation, the input video signal itself is that which is compressed. The compression pathway may take advantage of the lack of high frequency sensitivity of human eyes in performing the compression.

However, feedback may be employed along the compression pathway by selectively using inter- or intra-prediction video encoding. In accordance with a feedback or predictive mode of operation, the compression pathway operates on a (relatively low energy) residual (e.g., a difference) resulting from subtraction of a predicted value of a current macro-block from the current macro-block. Depending upon which form of prediction is employed in a given instance, a residual or difference between a current macro-block and a predicted value of that macro-block based on at least a portion of that same frame (or picture) or on at least a portion of at least one other frame (or picture) is generated.

The resulting modified video signal then undergoes transform operations along the compression pathway. In one embodiment, a discrete cosine transform (DCT) operates on a set of video samples (e.g., luma, chroma, residual, etc.) to compute respective coefficient values for each of a predetermined number of basis patterns. For example, one embodiment includes 64 basis functions (e.g., such as for an 8×8 sample). Generally speaking, different embodiments may employ different numbers of basis functions (e.g., different transforms). Any combination of those respective basis functions, including appropriate and selective weighting thereof, may be used to represent a given set of video samples. Additional details related to various ways of performing transform operations are described in the technical literature associated with video encoding including those standards/draft standards that have been incorporated by reference as indicated above. The output from the transform processing includes such respective coefficient values. This output is provided to a quantizer.

Generally, most image blocks will typically yield coefficients (e.g., DCT coefficients in an embodiment operating in accordance with discrete cosine transform (DCT)) such that the most relevant DCT coefficients are of lower frequencies. Because of this and of the human eyes' relatively poor sensitivity to high frequency visual effects, a quantizer may be operable to convert most of the less relevant coefficients to a value of zero. That is to say, those coefficients whose relative contribution is below some predetermined value (e.g., some threshold) may be eliminated in accordance with the quantization process. A quantizer may also be operable to convert the significant coefficients into values that can be coded more efficiently than those that result from the transform process. For example, the quantization process may operate by dividing each respective coefficient by an integer value and discarding any remainder. Such a process, when operating on typical coding units or macro-blocks, typically yields a relatively low number of non-zero coefficients which are then delivered to an entropy encoder for lossless encoding and for use in accordance with a feedback path which may select intra-prediction and/or inter-prediction processing in accordance with video encoding.

An entropy encoder operates in accordance with a lossless compression encoding process. In comparison, the quantization operations are generally lossy. The entropy encoding process operates on the coefficients provided from the quantization process. Those coefficients may represent various characteristics (e.g., luma, chroma, residual, etc.). Various types of encoding may be employed by an entropy encoder. For example, context-adaptive binary arithmetic coding (CABAC) and/or context-adaptive variable-length coding (CAVLC) may be performed by the entropy encoder. For example, in accordance with at least one part of an entropy coding scheme, the data is converted to a (run, level) pairing (e.g., data 14, 3, 0, 4, 0, 0, −3 would be converted to the respective (run, level) pairs of (0, 14), (0, 3), (1, 4), (2,−3)). In advance, a table may be prepared that assigns variable length codes for value pairs, such that relatively shorter length codes are assigned to relatively common value pairs, and relatively longer length codes are assigned for relatively less common value pairs.

As the reader will understand, the operations of inverse quantization and inverse transform correspond to those of quantization and transform, respectively. For example, in an embodiment in which a DCT is employed within the transform operations, then an inverse DCT (IDCT) is that employed within the inverse transform operations.

A picture buffer, alternatively referred to as a digital picture buffer or a DPB, receives the signal from the IDCT module; the picture buffer is operative to store the current frame (or picture) and/or one or more other frames (or pictures) such as may be used in accordance with intra-prediction and/or inter-prediction operations as may be performed in accordance with video encoding. It is noted that in accordance with intra-prediction, a relatively small amount of storage may be sufficient, in that, it may not be necessary to store the current frame (or picture) or any other frame (or picture) within the frame (or picture) sequence. Such stored information may be employed for performing motion compensation and/or motion estimation in the case of performing inter-prediction in accordance with video encoding.

In one possible embodiment, for motion estimation, a respective set of luma samples (e.g., 16×16) from a current frame (or picture) are compared to respective buffered counterparts in other frames (or pictures) within the frame (or picture) sequence (e.g., in accordance with inter-prediction). In one possible implementation, a closest matching area is located (e.g., prediction reference) and a vector offset (e.g., motion vector) is produced. In a single frame (or picture), a number of motion vectors may be found and not all will necessarily point in the same direction. One or more operations as performed in accordance with motion estimation are operative to generate one or more motion vectors.

Motion compensation is operative to employ one or more motion vectors as may be generated in accordance with motion estimation. A prediction reference set of samples is identified and delivered for subtraction from the original input video signal in an effort hopefully to yield a relatively (e.g., ideally, much) lower energy residual. If such operations do not result in a yielded lower energy residual, motion compensation need not necessarily be performed and the transform operations may merely operate on the original input video signal instead of on a residual (e.g., in accordance with an operational mode in which the input video signal is provided straight through to the transform operation, such that neither intra-prediction nor inter-prediction are performed), or intra-prediction may be utilized and transform operations performed on the residual resulting from intra-prediction. Also, if the motion estimation and/or motion compensation operations are successful, the motion vector may also be sent to the entropy encoder along with the corresponding residual's coefficients for use in undergoing lossless entropy encoding.

The output from the overall video encoding operation is an output bit stream. It is noted that such an output bit stream may of course undergo certain processing in accordance with generating a continuous time signal which may be transmitted via a communication channel. For example, certain embodiments operate within wireless communication systems. In such an instance, an output bitstream may undergo appropriate digital to analog conversion, frequency conversion, scaling, filtering, modulation, symbol mapping, and/or any other operations within a wireless communication device that operate to generate a continuous time signal capable of being transmitted via a communication channel, etc.

Referring to embodiment 500 of FIG. 5, as may be seen with respect to this diagram, an input video signal is received by a video encoder. In certain embodiments, the input video signal is composed of coding units or macro-blocks (and/or may be partitioned into coding units (CUs)). The size of such coding units or macro-blocks may be varied and can include a number of pixels typically arranged in a square shape. In one embodiment, such coding units or macro-blocks have a size of 16×16 pixels. However, it is generally noted that a macro-block may have any desired size such as N×N pixels, where N is an integer. Of course, some implementations may include non-square shaped coding units or macro-blocks, although square shaped coding units or macro-blocks are employed in a preferred embodiment.

The input video signal may generally be referred to as corresponding to raw frame (or picture) image data. For example, raw frame (or picture) image data may undergo processing to generate luma and chroma samples. In some embodiments, the set of luma samples in a macro-block is of one particular arrangement (e.g., 16×16), and set of the chroma samples is of a different particular arrangement (e.g., 8×8). In accordance with the embodiment depicted herein, a video encoder processes such samples on a block by block basis.

The input video signal then undergoes mode selection by which the input video signal selectively undergoes intra and/or inter-prediction processing. Generally speaking, the input video signal undergoes compression along a compression pathway. When operating with no feedback (e.g., in accordance with neither inter-prediction nor intra-prediction), the input video signal is provided via the compression pathway to undergo transform operations (e.g., in accordance with discrete cosine transform (DCT)). Of course, other transforms may be employed in alternative embodiments. In this mode of operation, the input video signal itself is that which is compressed. The compression pathway may take advantage of the lack of high frequency sensitivity of human eyes in performing the compression.

However, feedback may be employed along the compression pathway by selectively using inter- or intra-prediction video encoding. In accordance with a feedback or predictive mode of operation, the compression pathway operates on a (relatively low energy) residual (e.g., a difference) resulting from subtraction of a predicted value of a current macro-block from the current macro-block. Depending upon which form of prediction is employed in a given instance, a residual or difference between a current macro-block and a predicted value of that macro-block based on at least a portion of that same frame (or picture) or on at least a portion of at least one other frame (or picture) is generated.

The resulting modified video signal then undergoes transform operations along the compression pathway. In one embodiment, a discrete cosine transform (DCT) operates on a set of video samples (e.g., luma, chroma, residual, etc.) to compute respective coefficient values for each of a predetermined number of basis patterns. For example, one embodiment includes 64 basis functions (e.g., such as for an 8×8 sample). Generally speaking, different embodiments may employ different numbers of basis functions (e.g., different transforms). Any combination of those respective basis functions, including appropriate and selective weighting thereof, may be used to represent a given set of video samples. Additional details related to various ways of performing transform operations are described in the technical literature associated with video encoding including those standards/draft standards that have been incorporated by reference as indicated above. The output from the transform processing includes such respective coefficient values. This output is provided to a quantizer.

Generally, most image blocks will typically yield coefficients (e.g., DCT coefficients in an embodiment operating in accordance with discrete cosine transform (DCT)) such that the most relevant DCT coefficients are of lower frequencies. Because of this and of the human eyes' relatively poor sensitivity to high frequency visual effects, a quantizer may be operable to convert most of the less relevant coefficients to a value of zero. That is to say, those coefficients whose relative contribution is below some predetermined value (e.g., some threshold) may be eliminated in accordance with the quantization process. A quantizer may also be operable to convert the significant coefficients into values that can be coded more efficiently than those that result from the transform process. For example, the quantization process may operate by dividing each respective coefficient by an integer value and discarding any remainder. Such a process, when operating on typical coding units or macro-blocks, typically yields a relatively low number of non-zero coefficients which are then delivered to an entropy encoder for lossless encoding and for use in accordance with a feedback path which may select intra-prediction and/or inter-prediction processing in accordance with video encoding.

An entropy encoder operates in accordance with a lossless compression encoding process. In comparison, the quantization operations are generally lossy. The entropy encoding process operates on the coefficients provided from the quantization process. Those coefficients may represent various characteristics (e.g., luma, chroma, residual, etc.). Various types of encoding may be employed by an entropy encoder. For example, context-adaptive binary arithmetic coding (CABAC) and/or context-adaptive variable-length coding (CAVLC) may be performed by the entropy encoder. For example, in accordance with at least one part of an entropy coding scheme, the data is converted to a (run, level) pairing (e.g., data 14, 3, 0, 4, 0, 0, −3 would be converted to the respective (run, level) pairs of (0, 14), (0, 3), (1, 4), (2,−3)). In advance, a table may be prepared that assigns variable length codes for value pairs, such that relatively shorter length codes are assigned to relatively common value pairs, and relatively longer length codes are assigned for relatively less common value pairs.

As the reader will understand, the operations of inverse quantization and inverse transform correspond to those of quantization and transform, respectively. For example, in an embodiment in which a DCT is employed within the transform operations, then an inverse DCT (IDCT) is that employed within the inverse transform operations.

An adaptive loop filter (ALF) is implemented to process the output from the inverse transform block. Such an adaptive loop filter (ALF) is applied to the decoded picture before it is stored in a picture buffer (sometimes referred to as a DPB, digital picture buffer). The adaptive loop filter (ALF) is implemented to reduce coding noise of the decoded picture, and the filtering thereof may be selectively applied on a slice by slice basis, respectively, for luminance and chrominance whether or not the adaptive loop filter (ALF) is applied either at slice level or at block level. Two-dimensional 2-D finite impulse response (FIR) filtering may be used in application of the adaptive loop filter (ALF). The coefficients of the filters may be designed slice by slice at the encoder, and such information is then signaled to the decoder (e.g., signaled from a transmitter communication device including a video encoder [alternatively referred to as encoder] to a receiver communication device including a video decoder [alternatively referred to as decoder]).

One embodiment operates by generating the coefficients in accordance with Wiener filtering design. In addition, it may be applied on a block by block based at the encoder whether the filtering is performed and such a decision is then signaled to the decoder (e.g., signaled from a transmitter communication device including a video encoder [alternatively referred to as encoder] to a receiver communication device including a video decoder [alternatively referred to as decoder]) based on quadtree structure, where the block size is decided according to the rate-distortion optimization. It is noted that the implementation of using such 2-D filtering may introduce a degree of complexity in accordance with both encoding and decoding. For example, by using 2-D filtering in accordance and implementation of an adaptive loop filter (ALF), there may be some increasing complexity within encoder implemented within the transmitter communication device as well as within a decoder implemented within a receiver communication device.

In certain optional embodiments, the output from the de-blocking filter is provided to one or more other in-loop filters (e.g., implemented in accordance with adaptive loop filter (ALF), sample adaptive offset (SAO) filter, and/or any other filter type) implemented to process the output from the inverse transform block. For example, such an ALF is applied to the decoded picture before it is stored in a picture buffer (again, sometimes alternatively referred to as a DPB, digital picture buffer). Such an ALF is implemented to reduce coding noise of the decoded picture, and the filtering thereof may be selectively applied on a slice by slice basis, respectively, for luminance and chrominance whether or not such an ALF is applied either at slice level or at block level. Two-dimensional 2-D finite impulse response (FIR) filtering may be used in application of such an ALF. The coefficients of the filters may be designed slice by slice at the encoder, and such information is then signaled to the decoder (e.g., signaled from a transmitter communication device including a video encoder [alternatively referred to as encoder] to a receiver communication device including a video decoder [alternatively referred to as decoder]).

One embodiment is operative to generate the coefficients in accordance with Wiener filtering design. In addition, it may be applied on a block by block based at the encoder whether the filtering is performed and such a decision is then signaled to the decoder (e.g., signaled from a transmitter communication device including a video encoder [alternatively referred to as encoder] to a receiver communication device including a video decoder [alternatively referred to as decoder]) based on quadtree structure, where the block size is decided according to the rate-distortion optimization. It is noted that the implementation of using such 2-D filtering may introduce a degree of complexity in accordance with both encoding and decoding. For example, by using 2-D filtering in accordance and implementation of an ALF, there may be some increasing complexity within encoder implemented within the transmitter communication device as well as within a decoder implemented within a receiver communication device.

As mentioned with respect to other embodiments, the use of an ALF can provide any of a number of improvements in accordance with such video processing, including an improvement on the objective quality measure by the peak to signal noise ratio (PSNR) that comes from performing random quantization noise removal. In addition, the subjective quality of a subsequently encoded video signal may be achieved from illumination compensation, which may be introduced in accordance with performing offset processing and scaling processing (e.g., in accordance with applying a gain) in accordance with ALF processing.

With respect to one type of an in-loop filter, the use of an adaptive loop filter (ALF) can provide any of a number of improvements in accordance with such video processing, including an improvement on the objective quality measure by the peak to signal noise ratio (PSNR) that comes from performing random quantization noise removal. In addition, the subjective quality of a subsequently encoded video signal may be achieved from illumination compensation, which may be introduced in accordance with performing offset processing and scaling processing (e.g., in accordance with applying a gain) in accordance with adaptive loop filter (ALF) processing.

Receiving the signal output from the ALF is a picture buffer, alternatively referred to as a digital picture buffer or a DPB; the picture buffer is operative to store the current frame (or picture) and/or one or more other frames (or pictures) such as may be used in accordance with intra-prediction and/or inter-prediction operations as may be performed in accordance with video encoding. It is noted that in accordance with intra-prediction, a relatively small amount of storage may be sufficient, in that, it may not be necessary to store the current frame (or picture) or any other frame (or picture) within the frame (or picture) sequence. Such stored information may be employed for performing motion compensation and/or motion estimation in the case of performing inter-prediction in accordance with video encoding.

In one possible embodiment, for motion estimation, a respective set of luma samples (e.g., 16×16) from a current frame (or picture) are compared to respective buffered counterparts in other frames (or pictures) within the frame (or picture) sequence (e.g., in accordance with inter-prediction). In one possible implementation, a closest matching area is located (e.g., prediction reference) and a vector offset (e.g., motion vector) is produced. In a single frame (or picture), a number of motion vectors may be found and not all will necessarily point in the same direction. One or more operations as performed in accordance with motion estimation are operative to generate one or more motion vectors.

Motion compensation is operative to employ one or more motion vectors as may be generated in accordance with motion estimation. A prediction reference set of samples is identified and delivered for subtraction from the original input video signal in an effort hopefully to yield a relatively (e.g., ideally, much) lower energy residual. If such operations do not result in a yielded lower energy residual, motion compensation need not necessarily be performed and the transform operations may merely operate on the original input video signal instead of on a residual (e.g., in accordance with an operational mode in which the input video signal is provided straight through to the transform operation, such that neither intra-prediction nor inter-prediction are performed), or intra-prediction may be utilized and transform operations performed on the residual resulting from intra-prediction. Also, if the motion estimation and/or motion compensation operations are successful, the motion vector may also be sent to the entropy encoder along with the corresponding residual's coefficients for use in undergoing lossless entropy encoding.

The output from the overall video encoding operation is an output bit stream. It is noted that such an output bit stream may of course undergo certain processing in accordance with generating a continuous time signal which may be transmitted via a communication channel. For example, certain embodiments operate within wireless communication systems. In such an instance, an output bitstream may undergo appropriate digital to analog conversion, frequency conversion, scaling, filtering, modulation, symbol mapping, and/or any other operations within a wireless communication device that operate to generate a continuous time signal capable of being transmitted via a communication channel, etc.

Referring to embodiment 600 of FIG. 6, with respect to this diagram depicting an alternative embodiment of a video encoder, such a video encoder carries out prediction, transform, and encoding processes to produce a compressed output bit stream. Such a video encoder may operate in accordance with and be compliant with one or more video encoding protocols, standards, and/or recommended practices such as ISO/IEC 14496-10—MPEG-4 Part 10, AVC (Advanced Video Coding), alternatively referred to as H.264/MPEG-4 Part 10 or AVC (Advanced Video Coding), ITU H.264/MPEG4-AVC.

It is noted that a corresponding video decoder, such as located within a device at another end of a communication channel, is operative to perform the complementary processes of decoding, inverse transform, and reconstruction to produce a respective decoded video sequence that is (ideally) representative of the input video signal.

In comparing this diagram to the pervious diagram, the signal path output from the inverse quantization and inverse transform (e.g., IDCT) block, which is provided to the intra-prediction block, is also provided to a de-blocking filter. The output from the de-blocking filter is provided to one or more other in-loop filters (e.g., implemented in accordance with adaptive loop filter (ALF), sample adaptive offset (SAO) filter, and/or any other filter type) implemented to process the output from the inverse transform block. For example, in one possible embodiment, a SAO filter is applied to the decoded picture before it is stored in a picture buffer (again, sometimes alternatively referred to as a DPB, digital picture buffer).

With respect to any video encoder architecture implemented to generate an output bitstream, it is noted that such architectures may be implemented within any of a variety of communication devices. The output bitstream may undergo additional processing including error correction code (ECC), forward error correction (FEC), etc. thereby generating a modified output bitstream having additional redundancy deal therein. Also, as may be understood with respect to such a digital signal, it may undergo any appropriate processing in accordance with generating a continuous time signal suitable for or appropriate for transmission via a communication channel. That is to say, such a video encoder architecture may be implemented within a communication device operative to perform transmission of one or more signals via one or more communication channels. Additional processing may be made on an output bitstream generated by such a video encoder architecture thereby generating a continuous time signal that may be launched into a communication channel.

Figure 7:
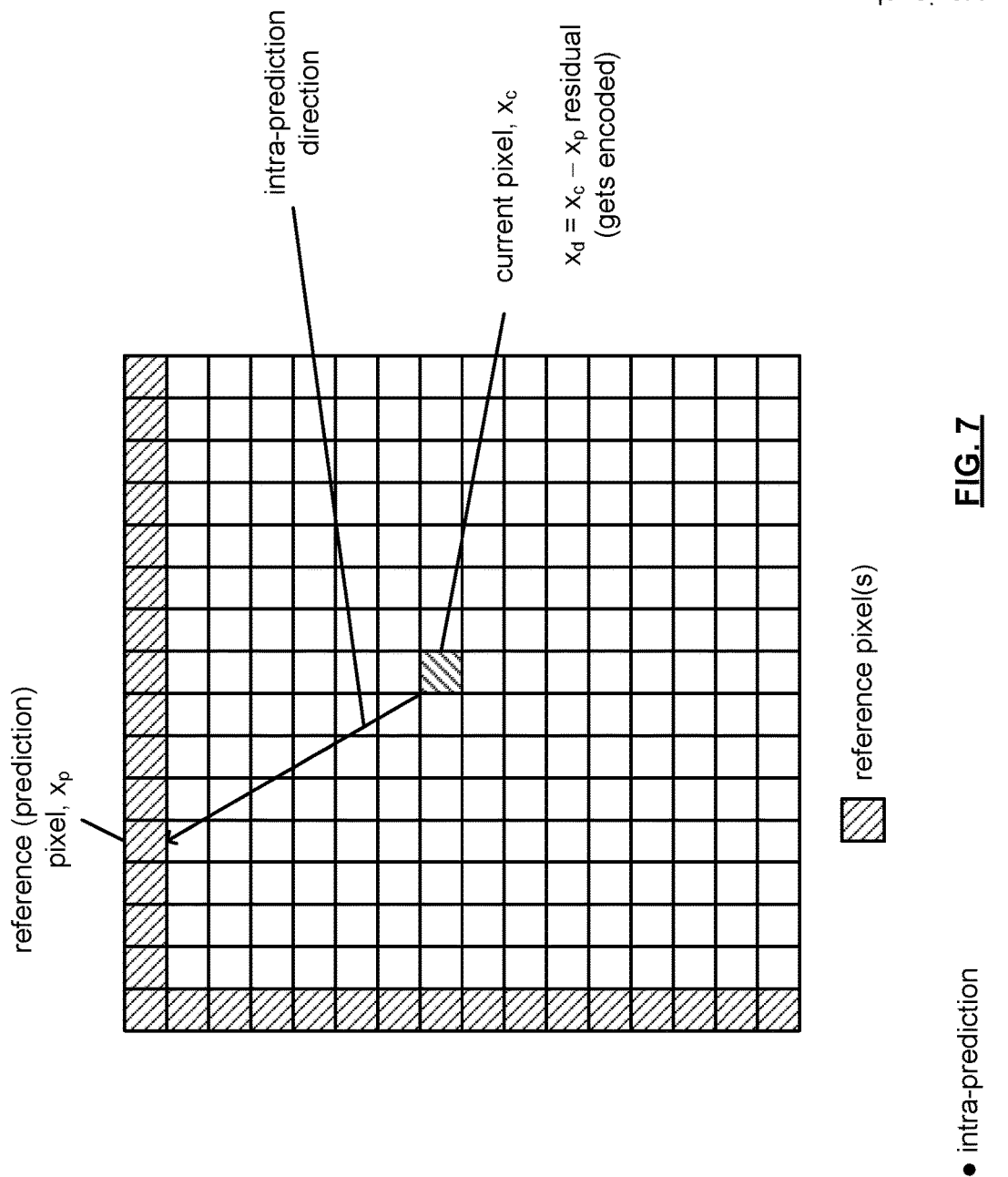
FIG. 7 is a diagram illustrating an embodiment of intra-prediction processing.

FIG. 7 is a diagram illustrating an embodiment 700 of intra-prediction processing. As can be seen with respect to this diagram, a current block of video data (e.g., often times being square in shape and including generally N×N pixels) undergoes processing to estimate the respective pixels therein. Previously coded pixels located above and to the left of the current block are employed in accordance with such intra-prediction. From certain perspectives, an intra-prediction direction may be viewed as corresponding to a vector extending from a current pixel to a reference pixel located above or to the left of the current pixel. Details of intra-prediction as applied to coding in accordance with H.264/AVC are specified within the corresponding standard (e.g., International Telecommunication Union, ITU-T, TELE-COMMUNICATION STANDARDIZATION SECTOR OF ITU, H.264 (March 2010), SERIES H: AUDIOVISUAL AND MULTIMEDIA SYSTEMS, Infrastructure of audiovisual services—Coding of moving video, Advanced video coding for generic audiovisual services, Recommendation ITU-T H.264, also alternatively referred to as International Telecomm ISO/IEC 14496-10—MPEG-4 Part 10, AVC (Advanced Video Coding), H.264/MPEG-4 Part 10 or AVC (Advanced Video Coding), ITU H.264/MPEG4-AVC, or equivalent) that is incorporated by reference above.

The residual, which is the difference between the current pixel and the reference or prediction pixel, is that which gets encoded. As can be seen with respect to this diagram, intra-prediction operates using pixels within a common frame (or picture). It is of course noted that a given pixel may have different respective components associated therewith, and there may be different respective sets of samples for each respective component.

Figure 8:
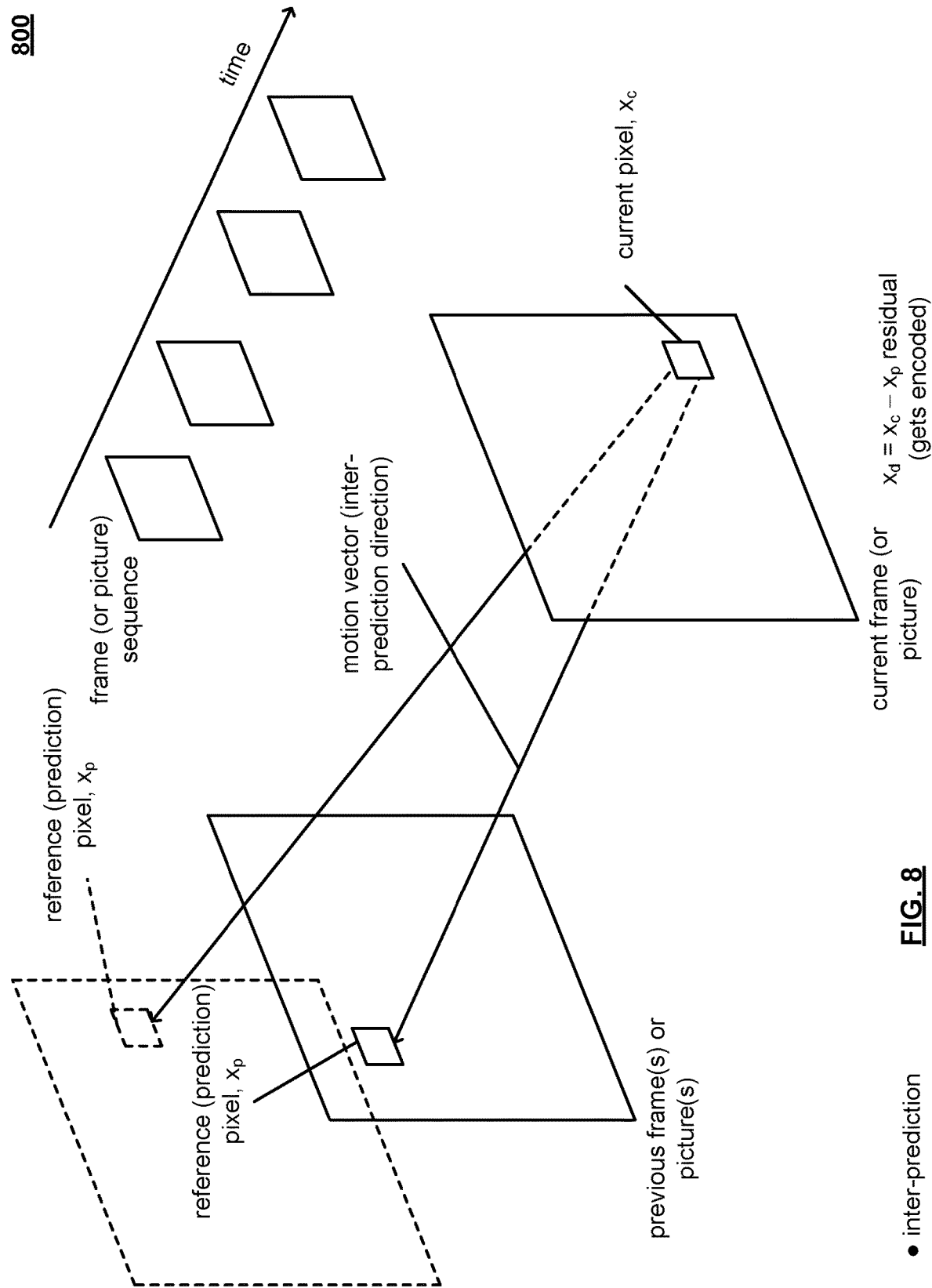
FIG. 8 is a diagram illustrating an embodiment of inter-prediction processing.

FIG. 8 is a diagram illustrating an embodiment 800 of inter-prediction processing. In contradistinction to intra-prediction, inter-prediction is operative to identify a motion vector (e.g., an inter-prediction direction) based on a current set of pixels within a current frame (or picture) and one or more sets of reference or prediction pixels located within one or more other frames (or pictures) within a frame (or picture) sequence. As can be seen, the motion vector extends from the current frame (or picture) to another frame (or picture) within the frame (or picture) sequence. Inter-prediction may utilize sub-pixel interpolation, such that a prediction pixel value corresponds to a function of a plurality of pixels in a reference frame or picture.

A residual may be calculated in accordance with inter-prediction processing, though such a residual is different from the residual calculated in accordance with intra-prediction processing. In accordance with inter-prediction processing, the residual at each pixel again corresponds to the difference between a current pixel and a predicted pixel value. However, in accordance with inter-prediction processing, the current pixel and the reference or prediction pixel are not located within the same frame (or picture). While this diagram shows inter-prediction as being employed with respect to one or more previous frames or pictures, it is also noted that alternative embodiments may operate using references corresponding to frames before and/or after a current frame. For example, in accordance with appropriate buffering and/or memory management, a number of frames may be stored. When operating on a given frame, references may be generated from other frames that precede and/or follow that given frame.

Coupled with the CU, a basic unit may be employed for the prediction partition mode, namely, the prediction unit, or PU. It is also noted that the PU is defined only for the last depth CU, and its respective size is limited to that of the CU.

Figure 9:
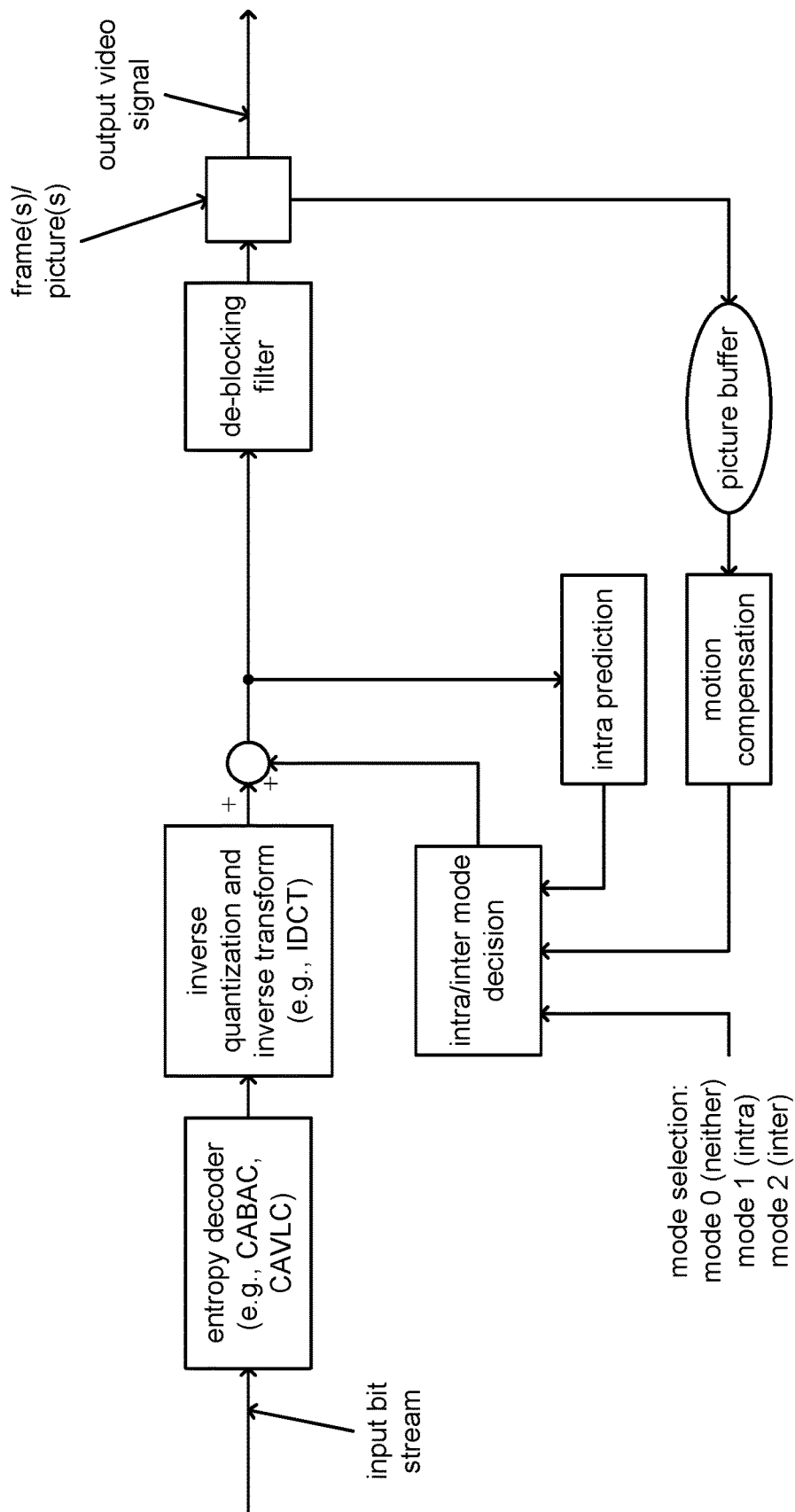
FIG. 9 and FIG. 10 are diagrams illustrating various embodiments of video decoding architectures.
Figure 10:
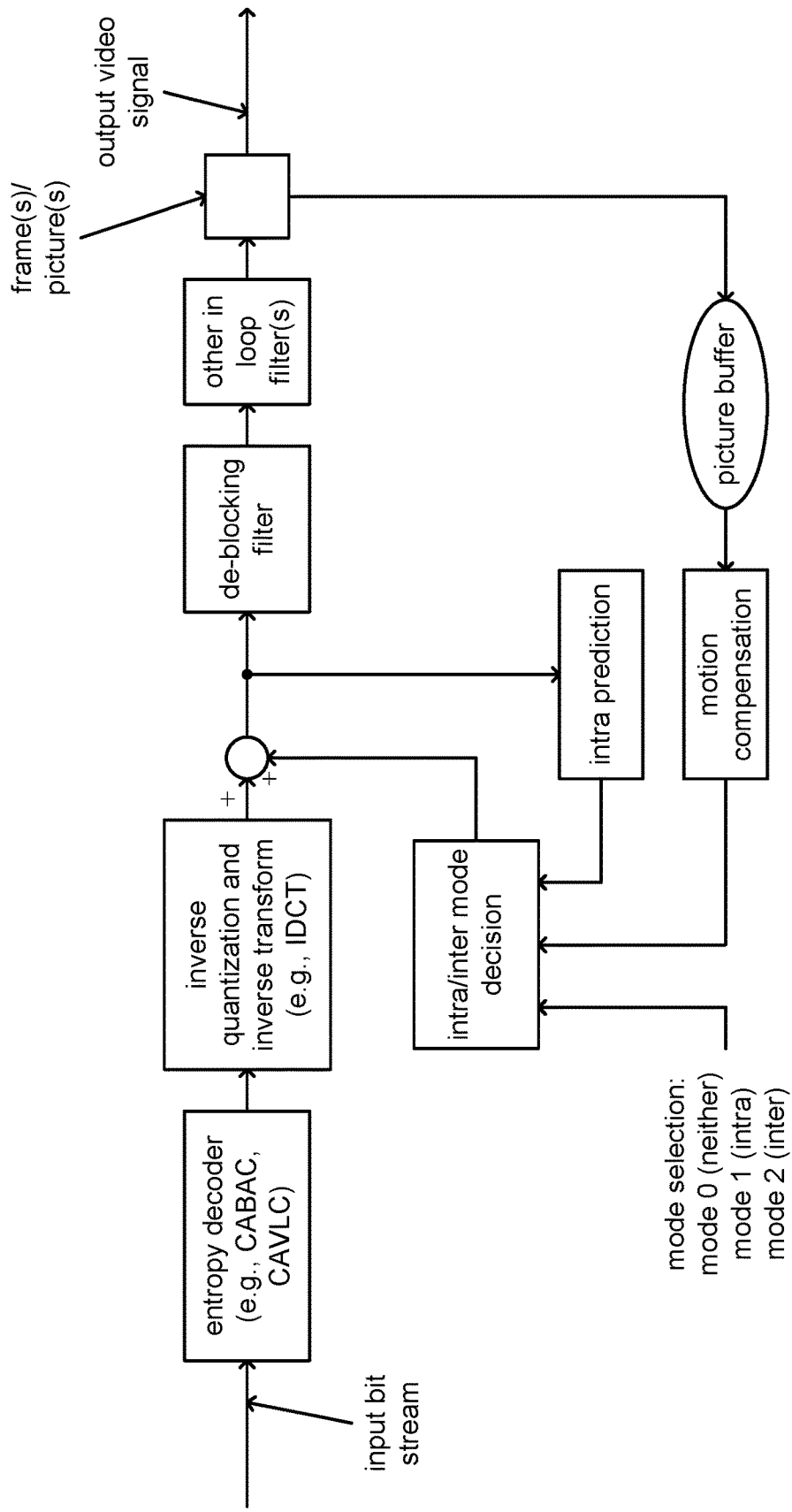

FIG. 9 and FIG. 10 are diagrams illustrating various embodiments 900 and 1000, respectively, of video decoding architectures.

Generally speaking, such video decoding architectures operate on an input bitstream. It is of course noted that such an input bitstream may be generated from a signal that is received by a communication device from a communication channel. Various operations may be performed on a continuous time signal received from the communication channel, including digital sampling, demodulation, scaling, filtering, etc. such as may be appropriate in accordance with generating the input bitstream. Moreover, certain embodiments, in which one or more types of error correction code (ECC), forward error correction (FEC), etc. may be implemented, may perform appropriate decoding in accordance with such ECC, FEC, etc. thereby generating the input bitstream. That is to say, in certain embodiments in which additional redundancy may have been made in accordance with generating a corresponding output bitstream (e.g., such as may be launched from a transmitter communication device or from the transmitter portion of a transceiver communication device), appropriate processing may be performed in accordance with generating the input bitstream. Overall, such a video decoding architectures and lamented to process the input bitstream thereby generating an output video signal corresponding to the original input video signal, as closely as possible and perfectly in an ideal case, for use in being output to one or more video display capable devices.

Referring to the embodiment 900 of FIG. 9, generally speaking, a decoder such as an entropy decoder (e.g., which may be implemented in accordance with CABAC, CAVLC, etc.) processes the input bitstream in accordance with performing the complementary process of encoding as performed within a video encoder architecture. The input bitstream may be viewed as being, as closely as possible and perfectly in an ideal case, the compressed output bitstream generated by a video encoder architecture. Of course, in a real-life application, it is possible that some errors may have been incurred in a signal transmitted via one or more communication links. The entropy decoder processes the input bitstream and extracts the appropriate coefficients, such as the DCT coefficients (e.g., such as representing chroma, luma, etc. information) and provides such coefficients to an inverse quantization and inverse transform block. In the event that a DCT transform is employed, the inverse quantization and inverse transform block may be implemented to perform an inverse DCT (IDCT) operation. Subsequently, A/D blocking filter is implemented to generate the respective frames and/or pictures corresponding to an output video signal. These frames and/or pictures may be provided into a picture buffer, or a digital picture buffer (DPB) for use in performing other operations including motion compensation. Generally speaking, such motion compensation operations may be viewed as corresponding to inter-prediction associated with video encoding. Also, intra-prediction may also be performed on the signal output from the inverse quantization and inverse transform block. Analogously as with respect to video encoding, such a video decoder architecture may be implemented to perform mode selection between performing it neither intra-prediction nor inter-prediction, inter-prediction, or intra-prediction in accordance with decoding an input bitstream thereby generating an output video signal.

Referring to the embodiment 1000 of FIG. 10, in certain optional embodiments, one or more in-loop filters (e.g., implemented in accordance with adaptive loop filter (ALF), sample adaptive offset (SAO) filter, and/or any other filter type) such as may be implemented in accordance with video encoding as employed to generate an output bitstream, a corresponding one or more in-loop filters may be implemented within a video decoder architecture. In one embodiment, an appropriate implementation of one or more such in-loop filters is after the de-blocking filter.

In accordance with some possible embodiments, a sample adaptive offset (SAO) process may be performed after the completion of the de-blocking filter process for the decoded picture (e.g., such as in accordance with an SAO filter implemented within the other in loop filter(s) in FIG. 6). This process is performed on a region basis which is defined to be one or more complete largest coding units (LCUs).

Figure 11:
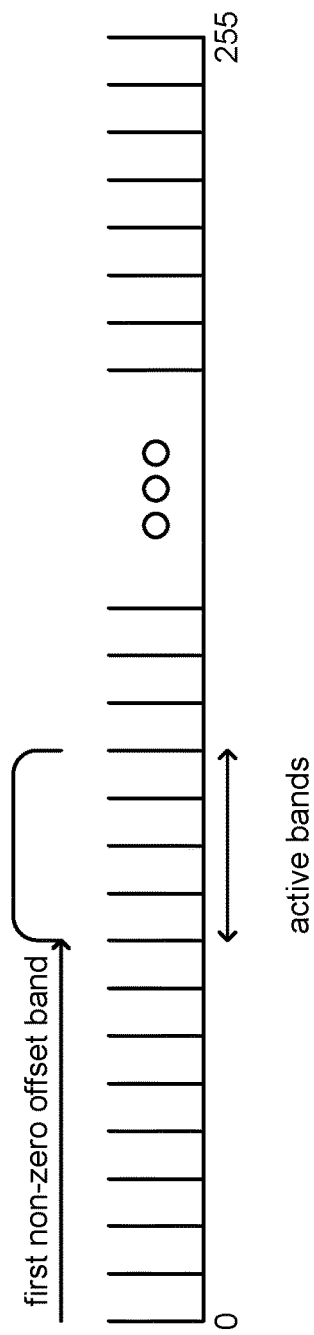
FIG. 11 illustrates an embodiment of a band offset sample adaptive offset (SAO) filtering process.

FIG. 11 illustrates an embodiment 1100 of a band offset sample adaptive offset (SAO) filtering process. This diagram illustrates the concept of the band offset SAO. After each offset is applied, resulting pixels are clipped to the valid 8-bit pixel range [0,255]. In this diagram, offsets are applied to four consecutive, active bands; the remaining bands are not modified. Of course, in other embodiments, such offsets may be applied to non-consecutive bands.

Figure 12:
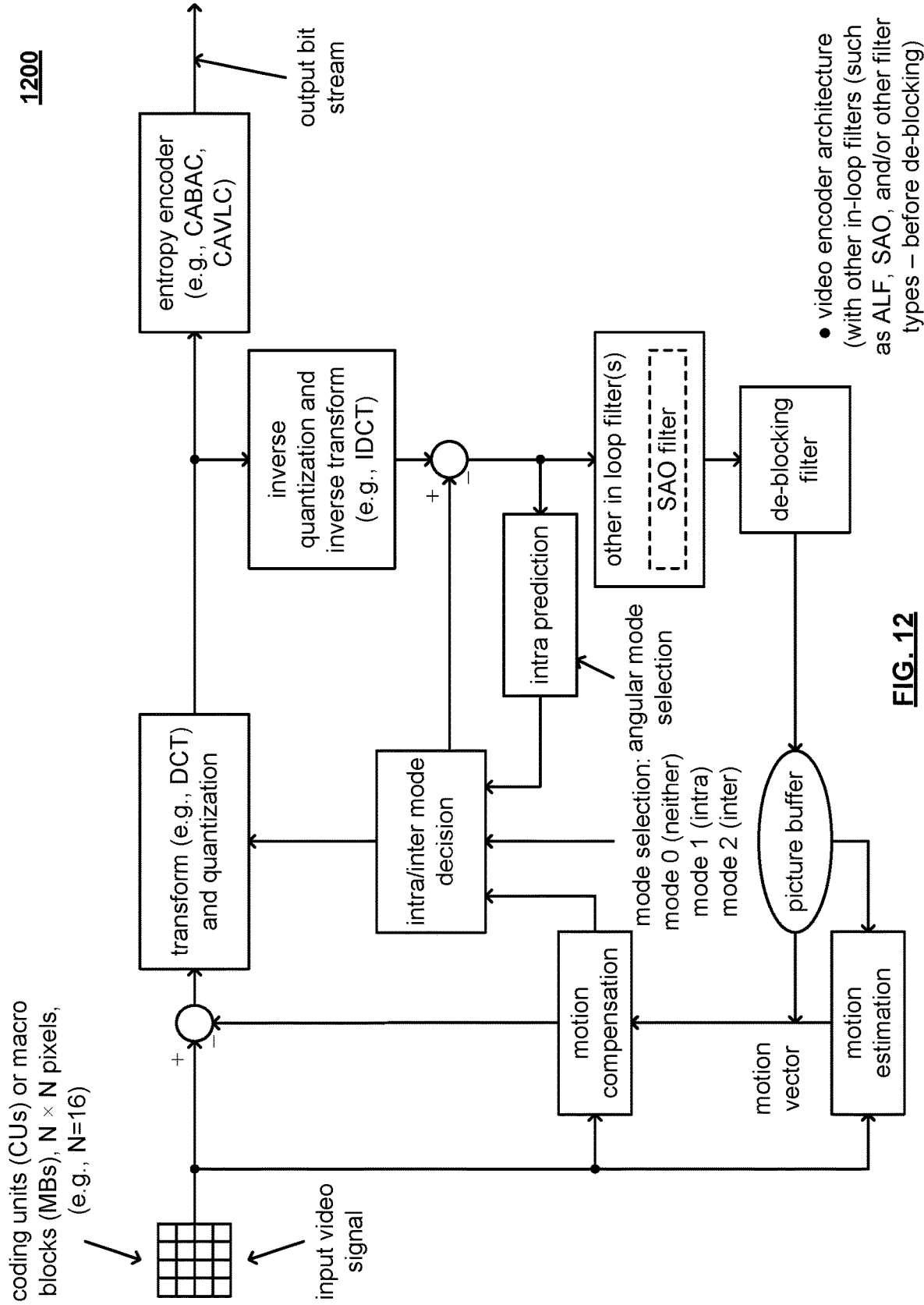
FIG. 12 illustrates an alternative embodiment of a video encoding architecture.

FIG. 12 illustrates an alternative embodiment 1200 of a video encoding architecture. In such an embodiment 1200, an any such one or more other in-loop filters (e.g., implemented in accordance with adaptive loop filter (ALF), sample adaptive offset (SAO) filter, and/or any other filter type) may implemented to process the output from the inverse quantization and inverse transform block (e.g., before the de-blocking filter). In other words, in such embodiments, such one or more other in-loop filters (e.g., SAO filter on one embodiment) may be applied before de-blocking. In alternative embodiments, such in-loop filters (e.g., implemented in accordance with adaptive loop filter (ALF), sample adaptive offset (SAO) filter, and/or any other filter type) may be implemented before de-blocking. However, various aspects, embodiments, and/or their equivalents, of the invention operate to apply such in-loop filters (e.g., implemented in accordance with adaptive loop filter (ALF), sample adaptive offset (SAO) filter, and/or any other filter type) before de-blocking as shown in FIG. 12.

In accordance with some embodiments, certain undesirable blocky artifacts may occur when SAO is operative and turned on (e.g., with respect to embodiments in which such SAO is implemented with respect to the output from the de-blocking). In those embodiments, this was mainly because two neighboring LCUs were using different band offset values. To mitigate this problem, such SAO may be applied before de-blocking and the de-blocking may be used to reduce any such undesirable and occurring blocky artifacts in such situations. In this case, the boundary strength and variable $\beta$ and $t_C$ used in de-blocking are also decided by the SAO parameters.

From certain perspectives, a band offset SAO may be viewed essentially as being a correction filter (e.g., a histogram correction filter in some embodiments). Pixels are classified based on their intensity value to generate a distribution thereof. For example, with respect to a histogram embodiment, the pixels (e.g., of one or more largest coding unit (LCU)) are classified based on their intensity value into histogram-bins or "bands". The entire pixel range (0-255) is divided into 32 uniform bands, and a specific offset is added to all the pixels in each band. The encoder selects the offset to be applied from the range [−7,7].

While an offset could be applied to all 32 bands, in order to simplify the band offset process and reduce overhead, a reduced set (e.g., only 4 consecutive bands) can actually be modified by band offset SAO in any LCU. The encoder selects four consecutive bands, for which offsets will be transmitted. The remaining 28 bands will not be modified (zero offset). Since there are 32 possible bands, the first band with a non-zero offset is signalled in the bitstream. The band_position parameter carries this information. The remaining three active bands can be determined by (band_position+i) % 32 with i∈[1,3]. Note the modulo-operation here, so if the first band is 29, 30, or 31, the remaining bands will wrap around back to 0.

FIG. 13 illustrates various embodiments 1300 of indication (adaptive and/or explicit signaling) transmitted band offsets in sample adaptive offset (SAO) band offset mode. Such operation may be effectuated in accordance with adaptively indicating the number of transmitted band offsets in SAO band offset mode. For example, the number of transmitted band offsets in SAO band offset mode can be LCU size dependent (e.g., such that the number of transmitted band offsets in SAO band offset mode may be a function of LCU size). For example, if the LCU size decreases, the number of transmitted bands could also decrease. As another example, 4 transmitted band offsets can be used for 64×64 LCU and 3 transmitted band offsets can be used for 32×32 LCU and 2 transmitted band offsets can be used for 16×16. Generally, different respective numbers of transmitted band offsets in SAO band offset mode may be indicated based upon different respective sizes of LCUs.

The number of transmitted band offsets for each LCU size can also be explicitly signalled in SPS (sequence parameter set), PPS (picture parameter size), APS (adaptation parameter set), slice headers, LCU data, and/or using other portion(s).

FIG. 14 illustrates various embodiments 1400 of indication (adaptive and/or explicit signaling) band granularity in SAO band offset mode. Such operation may be effectuated in accordance with adaptively indicating the granularity in SAO band offset mode.

In certain embodiments, the entire pixel range (0-255) is divided into 32 uniform bands. Only 4 bands can actually be modified by band offset SAO in any LCU. The encoder (e.g., transmitter communication device) selects four consecutive bands, for which offsets will be transmitted. The remaining 28 bands will not be modified (e.g., zero offset). In each band, a specific offset is added to all the pixels.

Since LCU sizes can be varied (e.g., 64×64, 32×32 or 16×16), the granularity of bands can be adaptive. For example, the smaller LCU size, the coarser granularity. As another example, if LCU size is 32×32, [0,255] can be uniformly divided into 16 bands and each band covers 16 continuous intensity values. Generally, different respective granularities of bands in SAO band offset mode may be indicated based upon different respective sizes of LCUs.

The band granularity for each LCU size can also be explicitly signalled in SPS (sequence parameter set), PPS (picture parameter size), APS (adaptation parameter set), slice headers, LCU data, and/or using other portion(s).

Figure 15:
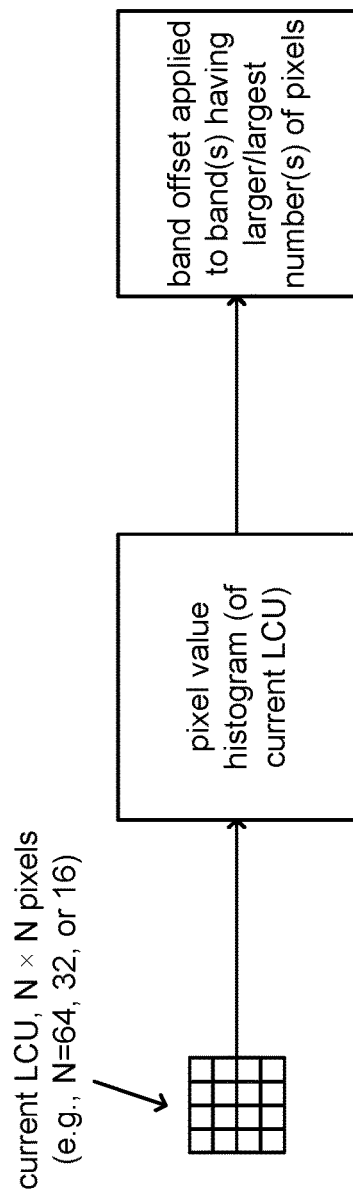
FIG. 15 illustrates an embodiment of implicit band index signaling.

FIG. 15 illustrates an embodiment 1500 of implicit band index signaling. For example, rather than explicitly signaling band indices, such information can be inferred (e.g., determined based on analysis of the LCU, determined inferentially, etc.) based on the pixel values of the current LCU. For example, by generating a pixel value histogram of an LCU, then band offsets can be applied to the bands in which the number of pixels is dominant. Such band indices need not necessarily be continuous (e.g., the band indices may be such that they have a discontinuous distribution such that at least two successive band indices may be separated from one another by at least one band index value, in other words, the band indices need not necessarily be continuous with respect one another).

Figure 16:
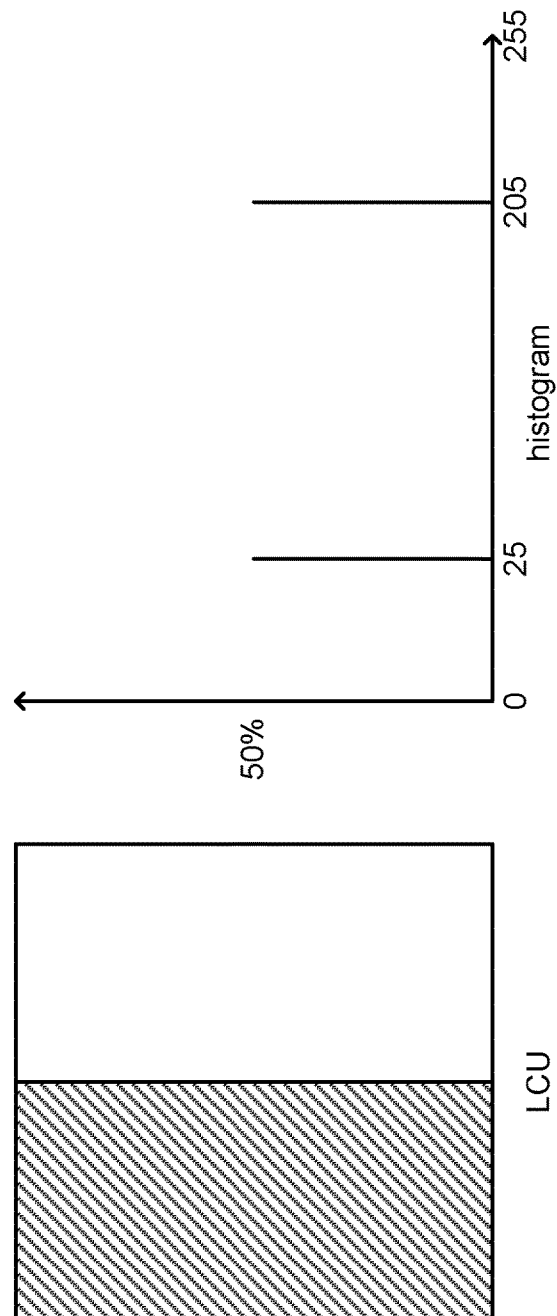
FIG. 16 illustrates an alternative embodiment of implicit band index signaling.

FIG. 16 illustrates an alternative embodiment 1600 of implicit band index signaling. In this very-simplified diagram showing a very simplified embodiment, there is an LCU with only two gray levels. The histogram (e.g., again, just one possible way to depict the distribution of pixels as the reader will understand) tells us 50% pixels have gray level 25 and 50% pixels have gray level 205. Therefore two band offsets will be sufficient instead of original four.

Figure 17:
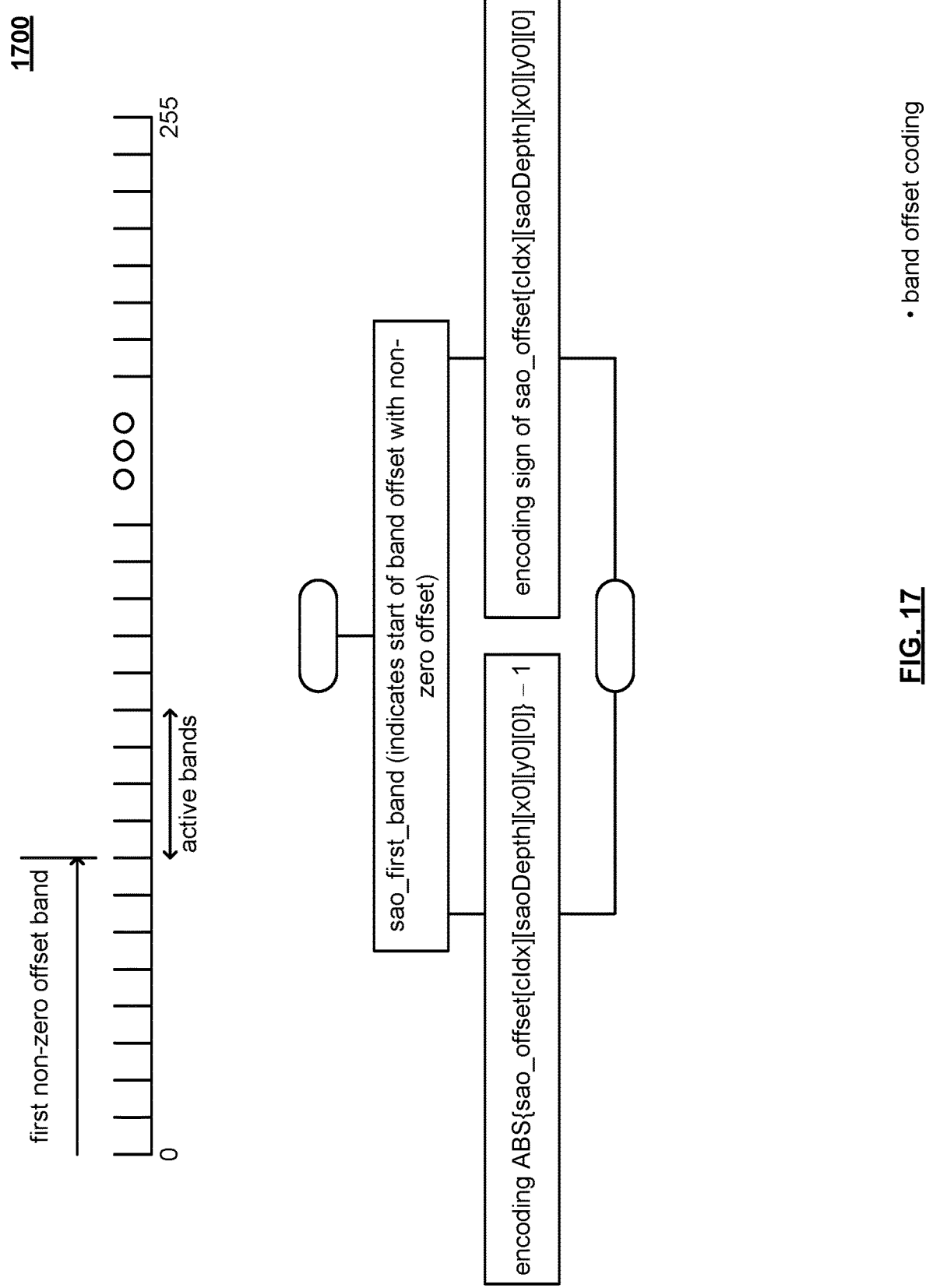
FIG. 17 illustrates an embodiment of band offset coding.

FIG. 17 illustrates an embodiment 1700 of band offset coding. In the band offset mode, since sao_band_position indicates the start of the band offset with non-zero offset, the first offset value sao_offset[cIdx][saoDepth][x0][y0][0] must be non-zero (e.g., in some instances, the smallest possible value would be a value of 1). Therefore, rather than encoding sao_offset[cIdx][saoDepth][x0][y0][0] directly, abs(sao_offset[cIdx][saoDepth][x0][y0][0])−1 and the sign bit of sao_offset[cIdx][saoDepth][x0][y0][0] can be encoded separately, where abs is a function calculating the absolute value.

Figure 18:
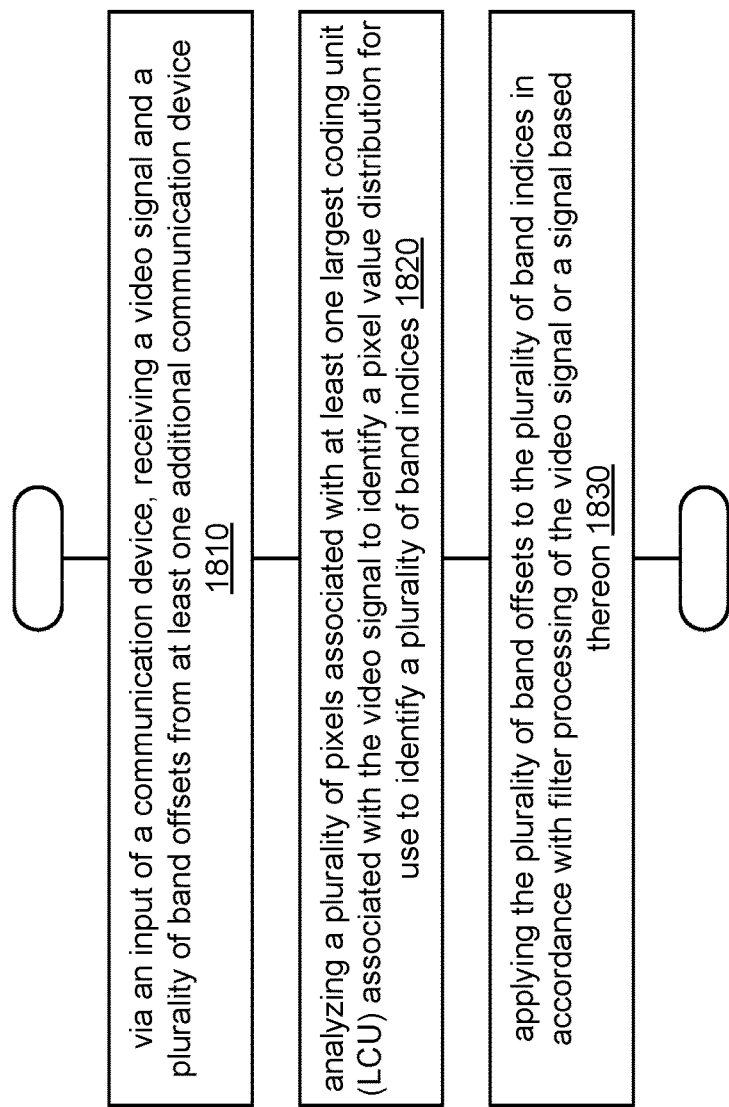

FIG. 18 and FIG. 19 illustrate various embodiments of method for operating one or more devices (e.g., communication devices, receiver and/or decoder devices, transmitter and/or encoder devices, etc.).

Referring to method 1800 of FIG. 18, the method 1800 begins by, via an input of a communication device, receiving a video signal and a plurality of band offsets from at least one additional communication device, as shown in a block 1810.

The method 1800 continues by analyzing a plurality of pixels associated with at least one largest coding unit (LCU) associated with the video signal to identify a pixel value distribution for use to identify a plurality of band indices, as shown in a block 1820.

The method 1800 then operates by applying the plurality of band offsets to the plurality of band indices in accordance with filter processing of the video signal or a signal based thereon, as shown in a block 1830.

Referring to method 1900 of FIG. 19, the method 1900 begins by, via an input of the communication device, receiving a video signal and a plurality of band offsets from at least one additional communication device, as shown in a block 1910.

The method 1900 continues by analyzing a plurality of pixels associated with at least one largest coding unit (LCU) associated with the video signal to identify a pixel value distribution for use to identify a plurality of band indices, as shown in a block 1920.

The method 1900 continues by performing sample adaptive offset (SAO) filter processing of the video signal or a signal based thereon to generate a first filtered signal, such that the SAO filter processing including applying the plurality of band offsets to the plurality of band indices, as shown in a block 1930.

The method 1900 continues by performing de-blocking filter processing of the first filtered signal to generate a second filtered signal, as shown in a block 1940.

It is also noted that the various operations and functions as described with respect to various methods herein may be performed within any of a number of types of communication devices, such as using a baseband processing module and/or a processing module implemented therein, and/or other components therein. For example, such a baseband processing module and/or processing module can generate such signals and perform such operations, processes, etc. as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing, operations, etc. in accordance with various aspects of the invention, and/or any other operations and functions as described herein, etc. or their respective equivalents. In some embodiments, such processing is performed cooperatively by a first processing module in a first device, and a second processing module within a second device. In other embodiments, such processing, operations, etc. are performed wholly by a baseband processing module and/or a processing module within one given device. In even other embodiments, such processing, operations, etc. are performed using at least a first processing module and a second processing module within a singular device.

Also, as may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A communication device comprising:
a processing circuitry configured to:
adaptively select, based on a first largest coding unit (LCU) size associated with a first portion of a video signal, a first plurality of band offsets corresponding to a first plurality of band indices to be used by another communication device to perform first sample adaptive offset (SAO) filter processing of the video signal; and
adaptively select, based on a second LCU size associated with a second portion of the video signal that is subsequent to the first portion of the video signal, a second plurality of band offsets corresponding to a second plurality of band indices to be used by the another communication device to perform second SAO filter processing of the video signal subsequently to the first SAO filter processing of the video signal; and
an output configured to:
transmit the video signal to the another communication device;
transmit the first plurality of band offsets corresponding to the first plurality of band indices to the another communication device; and
transmit the second plurality of band offsets corresponding to the second plurality of band indices to the another communication device, wherein the another communication device is configured to perform the first SAO filter processing of the video signal and the second SAO filter processing of the video signal to generate a processed video signal.

2. The communication device of claim 1, wherein:
the first plurality of band indices has a first granularity based on a first largest coding unit (LCU) size associated with a first portion of the video signal; and
the second plurality of band indices has a second granularity that is coarser than the first granularity based on a second LCU size that is smaller than the first LCU size and associated with a second portion of the video signal.

3. A communication device comprising:
a processing circuitry configured to:
select a first plurality of band offsets corresponding to a first plurality of band indices to be used by another communication device to perform first sample adaptive offset (SAO) filter processing of a video signal;
select a first start of a first band offset with a first non-zero offset for the first plurality of band offsets corresponding to the first plurality of band indices;
select a second plurality of band offsets corresponding to a second plurality of band indices to be used by the another communication device to perform second SAO filter processing of the video signal subsequently to the first SAO filter processing of the video signal;
select a second start of a second band offset with a second non-zero offset for the second plurality of band offsets corresponding to the second plurality of band indices; and
an output configured to:
transmit the video signal to the another communication device;
transmit the first start of the first band offset with the first non-zero offset to the another communication device;
transmit the second start of the second band offset with the second non-zero offset to the another communication device;
transmit the first plurality of band offsets corresponding to the first plurality of band indices to the another communication device; and
transmit the second plurality of band offsets corresponding to the second plurality of band indices to the another communication device, wherein the another communication device is configured to perform the first SAO filter processing of the video signal and the second SAO filter processing of the video signal to generate a processed video signal.

4. A communication device comprising:
a processing circuitry:
select a first plurality of band offsets corresponding to a first plurality of band indices to be used by another communication device to perform first sample adaptive offset (SAO) filter processing of a video signal; and
select a second plurality of band offsets corresponding to a second plurality of band indices to be used by the another communication device to perform second SAO filter processing of the video signal subsequently to the first SAO filter processing of the video signal; and an output configured to:
- transmit the video signal to the another communication device;
- transmit the first plurality of band offsets corresponding to the first plurality of band indices to the another communication device;
- transmit the second plurality of band offsets corresponding to the second plurality of band indices to the another communication device, wherein the another communication device is configured to perform the first SAO filter processing of the video signal and the second SAO filter processing of the video signal to generate a processed video signal and wherein at least one of:
- the first plurality of band indices has a first discontinuous distribution such that at least two successive of the first plurality of band indices are separated from one another by at least one band index value; or
- the second plurality of band indices has a second discontinuous distribution such that at least two successive of the second plurality of band indices are separated from one another by at least one band index value.

5. A method for execution by a communication device, the method comprising:
- selecting a first plurality of band offsets corresponding to a first plurality of band indices to be used by another communication device to perform first sample adaptive offset (SAO) filter processing of a video signal;
- selecting a first start of a first band offset with a first non-zero offset for the first plurality of band offsets corresponding to the first plurality of band indices to be used by the another communication device when performing the first SAO filter processing of the video signal;
- selecting a second plurality of band offsets corresponding to a second plurality of band indices to be used by the another communication device to perform second SAO filter processing of the video signal subsequently to the first SAO filter processing of the video signal;
- selecting a second start of a second band offset with a second non-zero offset for the second plurality of band offsets corresponding to the second plurality of band indices to be used by the another communication device when performing the second SAO filter processing of the video signal;
- transmitting, via an output of the communication device, the video signal to the another communication device;
- transmitting, via the output of the communication device, the first start of the first band offset with the first non-zero offset to the another communication device; and
- transmitting, via the output of the communication device, the second start of the second band offset with the second non-zero offset to the another communication device;
- transmitting, via the output of the communication device, the first plurality of band offsets corresponding to the first plurality of band indices to the another communication device; and
- transmitting, via the output of the communication device, the second plurality of band offsets corresponding to the second plurality of band indices to the another communication device, wherein the another communication device is configured to perform the first SAO filter processing of the video signal and the second SAO filter processing of the video signal to generate a processed video signal.

6. A method for execution by a communication device, the method comprising:
- selecting a first plurality of band offsets corresponding to a first plurality of band indices to be used by another communication device to perform first sample adaptive offset (SAO) filter processing of a video signal;
- selecting a second plurality of band offsets corresponding to a second plurality of band indices to be used by the another communication device to perform second SAO filter processing of the video signal subsequently to the first SAO filter processing of the video signal;
- transmitting, via an output of the communication device, the video signal to the another communication device;
- transmitting, via the output of the communication device, the first plurality of band offsets corresponding to the first plurality of band indices to the another communication device; and
- transmitting, via the output of the communication device, the second plurality of band offsets corresponding to the second plurality of band indices to the another communication device, wherein the another communication device is configured to perform the first SAO filter processing of the video signal and the second SAO filter processing of the video signal to generate a processed video signal; and wherein at least one of:
- the first plurality of band indices has a first discontinuous distribution such that at least two successive of the first plurality of band indices are separated from one another by at least one band index value; or
- the second plurality of band indices has a second discontinuous distribution such that at least two successive of the second plurality of band indices are separated from one another by at least one band index value.

7. A communication device comprising:
a processing circuitry:
- adaptively select a first plurality of band offsets corresponding to a first plurality of band indices based on a first largest coding unit (LCU) size associated with a first portion of a video signal to be used by another communication device to perform first sample adaptive offset (SAO) filter processing of the first portion of the video signal; and
- adaptively select a second plurality of band offsets corresponding to a second plurality of band indices based on a second LCU size associated with a second portion of the video signal to be used by the another communication device to perform second SAO filter processing of the second portion of the video signal subsequently to the first SAO filter processing of the first portion of the video signal, wherein the first plurality of band offsets corresponding to the first plurality of band indices includes a different number of band offsets corresponding to a different number of band indices than the second plurality of band offsets corresponding to the second plurality of band indices; and an output configured to:
- transmit the video signal to the another communication device;

transmit the first plurality of band offsets corresponding to the first plurality of band indices to the another communication device; and transmit the second plurality of band offsets corresponding to the second plurality of band indices to the another communication device, wherein the another communication device is configured to perform the first SAO filter processing of the video signal and the second SAO filter processing of the video signal to generate a processed video signal.

8. The communication device of claim 7, wherein:
the first plurality of band indices has a first granularity based on a first largest coding unit (LCU) size associated with the first portion of the video signal; and
the second plurality of band indices has a second granularity that is coarser than the first granularity based on a second LCU size that is smaller than the first LCU size and associated with the second portion of the video signal.

9. The communication device of claim 7 further comprising:
the processing circuitry:
select a first start of a first band offset with a first non-zero offset for the first plurality of band offsets corresponding to the first plurality of band indices to be used by the another communication device when performing the first SAO filter processing of the video signal;
select a second start of a second band offset with a second non-zero offset for the second plurality of band offsets corresponding to the second plurality of band indices to be used by the another communication device when performing the second SAO filter processing of the video signal; and
the output configured to:
transmit the first start of the first band offset with the first non-zero offset to the another communication device; and
transmit the second start of the second band offset with the second non-zero offset to the another communication device.

10. The communication device of claim 7, wherein at least one of:
the first plurality of band indices has a first discontinuous distribution such that at least two successive of the first plurality of band indices are separated from one another by at least one band index value; or
the second plurality of band indices has a second discontinuous distribution such that at least two successive of the second plurality of band indices are separated from one another by at least one band index value.

11. The communication device of claim 7, wherein the communication device is configured to support communications within at least one of a satellite communication system, a wireless communication system, a wired communication system, a fiber-optic communication system, or a mobile communication system.

12. A method for execution by a communication device, the method comprising:
adaptively selecting, based on a first largest coding unit (LCU) size associated with a first portion of a video signal, a first plurality of band offsets corresponding to a first plurality of band indices to be used by another communication device to perform first sample adaptive offset (SAO) filter processing of the video signal;
adaptively selecting, based on a second LCU size associated with a second portion of the video signal that is subsequent to the first portion of the video signal, a second plurality of band offsets corresponding to a second plurality of band indices to be used by the another communication device to perform second SAO filter processing of the video signal subsequently to the first SAO filter processing of the video signal;
transmitting, via an output of the communication device, the video signal to the another communication device;
transmitting, via the output of the communication device, the first plurality of band offsets corresponding to the first plurality of band indices to the another communication device; and
transmitting, via the output of the communication device, the second plurality of band offsets corresponding to the second plurality of band indices to the another communication device, wherein the another communication device is configured to perform the first SAO filter processing of the video signal and the second SAO filter processing of the video signal to generate a processed video signal.

13. The method of claim 12, wherein:
the first plurality of band indices has a first granularity based on a first largest coding unit (LCU) size associated with a first portion of the video signal; and
the second plurality of band indices has a second granularity that is coarser than the first granularity based on a second LCU size that is smaller than the first LCU size and associated with a second portion of the video signal.

14. The communication device of claim 3, wherein the first plurality of band offsets corresponding to the first plurality of band indices includes a different number of band offsets corresponding to a different number of band indices than the second plurality of band offsets corresponding to the second plurality of band indices.

15. The communication device of claim 4, wherein the another communication device is configured to:
receive the video signal from the communication device;
receive the first plurality of band offsets corresponding to the first plurality of band indices from the communication device;
receive the second plurality of band offsets corresponding to the second plurality of band indices from the communication device;
perform SAO filter processing of the video signal to generate a first filtered signal, wherein the SAO filter processing including to:
apply a first band offset of the first plurality of band offsets corresponding to a first band index of the first plurality of band indices to a first set of pixels within a first band of a first plurality of bands;
apply a second band offset of the second plurality of band offsets corresponding to a second band index of the second plurality of band indices to a second set of pixels within a second band of a second plurality of bands; and
perform de-blocking filter processing of the first filtered signal that is generated by the SAO filter processing to generate a second filtered signal.

16. The communication device of claim 4, wherein the communication device is configured to support communications within at least one of a satellite communication system, a wireless communication system, a wired communication system, a fiber-optic communication system, or a mobile communication system.

17. The method of claim 5, wherein the first plurality of band offsets corresponding to the first plurality of band indices includes a different number of band offsets corresponding to a different number of band indices than the second plurality of band offsets corresponding to the second plurality of band indices.

18. The method of claim 6, wherein the communication device is configured to support communications within at least one of a satellite communication system, a wireless communication system, a wired communication system, a fiber-optic communication system, or a mobile communication system.

* * * * *